United States Patent [19]
Celis et al.

[11] Patent Number: 5,819,255
[45] Date of Patent: Oct. 6, 1998

[54] SYSTEM AND METHOD FOR DATABASE QUERY OPTIMIZATION

[75] Inventors: Pedro Celis, Austin, Tex.; Jay Vaishnav, Cupertino; Hansjorg Zeller, Los Altos, both of Calif.

[73] Assignee: Tandem Computers, Inc., Cupertino, Calif.

[21] Appl. No.: 773,695

[22] Filed: Dec. 27, 1996

Related U.S. Application Data

[60] Division of Ser. No. 702,106, Aug. 23, 1996, and a continuation-in-part of Ser. No. 763,407, Dec. 11, 1996.
[51] Int. Cl.[6] .................................................. G06F 17/30
[52] U.S. Cl. ........................ 707/2; 707/3; 707/4; 707/5; 707/6
[58] Field of Search .................... 707/2, 3, 4, 5, 707/6

[56] References Cited

U.S. PATENT DOCUMENTS

| | | | |
|---|---|---|---|
| 4,769,772 | 9/1988 | Dwyer | 395/312 |
| 4,829,427 | 5/1989 | Green | 707/4 |
| 5,228,116 | 7/1993 | Harris et al. | 395/54 |

OTHER PUBLICATIONS

K. Mikkilineni and S. Su, "A Dynamic Interquery Optimization Method For Achieving Data Sharing Among Concurrent Queries", Ieee Comput. Soc. Press, pp. 477–486, Aug. 14, 1988.

*Primary Examiner*—Thomas G. Black
*Assistant Examiner*—Cheryl Lewis
*Attorney, Agent, or Firm*—Gary S. Williams; Flehr Hohbach Test Albritton & Herbert

[57] ABSTRACT

A system and method for optimizing a database query with improved performance enhancements is herein disclosed. The database query consists of one or more logical expressions. Through the repeated application of one or more rules, the logical expressions are transformed into physical expressions and in some cases, execution plans that implement the database query. Each expression has associated with it a set of group attributes that specifies its characteristic inputs and outputs and a cost that estimates the computational expense for executing the expression. The group attributes are used to categorize similar expressions into groups that are stored in a search data structure. They are also used to track duplicate expressions. The cost associated with an expression is used to guide the search process to consider those expressions that will produce low cost plans. The cost is estimated in accordance with a six-fold criteria with each criterion weighted to account for the context of the expression and the application's particular computing environment. The query optimizer is rule-based including transformation and implementation rules that are used to perform transformations on the logical expressions in a subproblem in order to produce a plan. A OnceGuidance guidance method is used to select a set of rules in certain cases that prevent the regeneration of an existing expression.

22 Claims, 19 Drawing Sheets

CONTEXT
308

LOGICAL EXPRESSION
304

Binding #1

Binding #2

Binding #3

Binding #4

SYSTEM AND METHOD FOR DATABASE QUERY OPTIMIZATION

This application is a division of Ser. No. 08/702,106, now pending filed Aug. 23, 1996 and a continuation-in-part of Ser. No. 08/763,407, now pending, filed Dec. 11, 1996. Application Ser. Nos. 08/702,106 and 08/763,407 are both hereby incorporated by reference.

The present invention relates generally to database query processing and specifically to rule-based database query optimizers.

BACKGROUND OF THE INVENTION

A central issue in the design of database systems is the query processing strategy that is employed. Considerable focus has been placed in this area since a poor strategy can adversely effect the performance of the database system. In SQL and similar query processing languages, a query can be expressed in a variety of different representations. Since the transfer of data that usually resides on secondary storage is slower than from main memory, it is imperative that the number of accesses to secondary storage be minimized. Typically, a user writes a query without considering the most efficient manner for realizing the query. This task becomes the responsibility of a query optimizer.

The objective of the query optimizer is to find an execution strategy that causes the result of the query to be produced in the most efficient ("optimal") manner. Optimality is used to denote the best strategy that satisfies a prescribed criteria. Often this criteria is the minimization of a defined metric, such as computational cost. Query optimization is a search process that entails producing a solution space of semantically equivalent expressions that represent the query. The semantically equivalent expressions are generated through the application of rules. The optimizer searches through the solution space finding the optimal solution that best satisfies the defined metric.

A key consideration in the design of a query optimizer is the minimization of its execution time as well as the conservation of memory space. The inefficient use of memory space and the execution of needless computations detrimentally affects the query optimizer's performance. Accordingly, there is a need to minimize the execution time of a query by utilizing efficient search procedures for finding the optimal solution.

Prior Art Tandem Query Optimizer

The present invention and a prior Tandem query optimizer utilize a search engine and a database implementor (DBI) to generate an optimal plan for an input query having an optimization goal. Portions of the prior Tandem query optimizer have been the subject of publications but it was never commercially or publicly used. The search engine generates a solution space from which an optimal solution or plan is selected. The solution space is defined by a set of rules and search heuristics provided by the DBI. The rules are used to generate solutions and the search heuristics guide the search engine to produce more promising solutions rather than all possible solutions.

The database query is represented as a query tree containing one or more expressions. An expression contains an operator having zero or more inputs that are expressions. The query optimizer utilizes two types of expressions: logical expressions, each of which contain a logical operator; and physical expressions, each of which contain a physical operator specifying a particular implementation for a corresponding logical operator. An implementation rule transforms a logical expression into an equivalent physical expression and a transformation rule produces an equivalent logical expression. The database query is initially composed of logical expressions. Through the application of one or more implementation and transformation rules, the logical expressions in the database query are transformed into physical expressions.

The search engine utilizes a search procedure that generates a "solution" for the database query by partitioning the database query into one or more smaller subproblems where each smaller subproblem can contain one or more expressions. Some of the subproblems form a subtree including other subproblems as inputs. A solution to each subproblem is generated in accordance with an order that generates a solution for each input subproblem before a solution for its associated parent subproblem is generated. The solution for the database query is then obtained as the combination of the solutions for each of the subproblems.

The search procedure utilizes a branch and bound technique for generating solutions for each subproblem. An initial solution is obtained for each subproblem that has an associated cost which is used as an upper bound for considering other candidate solutions. Additional solutions whose associated costs exceed the upper bound are eliminated from consideration. The solution having the lowest cost is selected as the optimal solution.

Solutions are generated through the application of implementation and transformation rules. Transformation rules produce equivalent expressions and implementation rules produce plans. Each rule has a pattern and a substitute. A pattern is the before expression that is matched with the expression that is being optimized. A substitute represents the semantically equivalent expression that is generated by applying the rule. A rule's pattern matches an expression when the expression contains the same operators in the same position as the rule's pattern. Prior to applying a rule to an expression, all possible bindings that match a rule's pattern are determined. The purpose of a binding is to find all possible expressions that can match a rule's pattern in order to generate every possible equivalent expression.

A search data structure is used to store the expressions that are generated during the search process including those that are eliminated from consideration. The search data structure is organized into equivalence classes denoted as groups. Each group consists of one or more logical and physical expressions that are semantically equivalent to one another. Initially each logical expression of the input query tree is represented as a separate group in the search data structure. As the optimizer applies rules to the expressions in the groups, additional equivalent expressions are added. Duplicate expressions are detected before they are inserted into the search data structure.

The search procedure utilizes guidance methods that guide it toward generating more viable plans. The guidance methods produce guidance structures which are heuristics that are used to select rules that will generate more promising solutions. The heuristics capture knowledge of the search procedure which is passed onto later processing stages in order to eliminate generating unnecessary and duplicate expressions.

While the prior Tandem query optimizer described above has functioned well in "laboratory" tests, the system has a number of shortcomings which limits its performance. In certain circumstances, the optimizer performs needless computations which increase the intensity of the search and in other circumstances makes inefficient use of memory space.

In the prior Tandem query optimizer, considerable expense was incurred in formulating all possible bindings that a rule's pattern can generate. There is the overhead of copying expressions, linking them together to formulate the new expression, storing them in the search data structure, and eventually destroying them. This overhead increases combinatorially as the number of alternative solutions that are stored in the search data structure increases with the application of the optimization rules. This needlessly increases the optimizer's memory space and computational expense.

Another shortcoming of the prior Tandem query optimizer pertains to merging groups in the search data structure. Previously when two groups were merged, the original references to the merged group was retained by the other expressions in the search data structure. A pointer was used to link the merged-to group with the merged group. A search of the contents contained in the merged-to group encompassed the additional computational expense of converting the original reference to the updated reference of the merged-to group. A search in this manner increases the computational expense of the optimizer.

A further shortcoming pertains to the method of detecting redundant expressions. Before an expression is inserted into the search data structure, a search is made to determine if it is currently stored therein. Previously, two expressions were considered equivalent if they contained the same expression and input expressions. However, each expression can differ with respect to the inputs that the expression requires (otherwise known as characteristic inputs) and the outputs that it generates (otherwise known as characteristic outputs). By not considering an expression's characteristic inputs and outputs, an expression can be erroneously considered the duplicate of another expression that produces a different result.

Another shortcoming is that there is no mechanism to prevent the needless generation and exploration of redundant expressions generated as a result of the repeated application of a rule to the rule's substitute. Certain rules cannot be applied to an expression matching a rule's pattern and to the expression corresponding to the rule's substitute since the original expression is regenerated. The redundant original expression is detected before it is stored in the search data structure. A more efficient strategy would be to prevent the application of the rule to the rule's substitute.

Yet another shortcoming is that the cost associated with an expression is based on certain predefined factors that do not consider an expression's context or the application's particular computing environment. Previously, an expression's cost was determined as a function of certain predefined resource consumption metrics, such as the number of CPU instructions that are likely to be executed, the number of messages that are likely to be exchanged, the number of I/O operations that are likely to be performed, and the amount of memory that the expression will consume. A set of predefined weights were applied to these metrics which biased each metric in accordance with an objective criteria. A more accurate representation of the expression's cost would consider the expression's context and the application's computing environment.

It is an object of the present invention to provide a computationally efficient system and method for processing database queries.

It is another object of the present invention to provide a method and system that provides an efficient method for generating an optimal plan for executing a database query.

It is another object of the present invention to provide a method and system that provides an efficient storage compaction scheme for a search data structure when searching for an optimal plan for a database query.

It is a further object of the present invention to provide a method and system that avoids the generation of redundant expressions when searching for an optimal plan for a database query.

It is yet a further object of the present invention to provide a method and system that incorporates context-sensitive information in estimating the cost associated with an expression when searching for an optimal plan for a database query.

It is yet a further object of the present invention to provide a method and system that incorporates information representing a particular computing environment in estimating the cost associated with an expression when searching for an optimal plan for a database query.

It is another object of the present invention to differentiate expressions based on the input and output values that an expression requires, the input and output values required by the expression's inputs, or the input and output values the expression's parent requires.

It is yet a further object of the present invention to detect redundant expressions based on the expression's group attributes.

Other general and specific objects of this invention will be apparent and evident from the accompanying drawings and the following description.

SUMMARY OF THE INVENTION

The present invention pertains to an improved method and system for optimizing SQL database queries. The query optimizer contains a search engine and a database implementor (DBI) that are used to generate an optimal plan for an input query having specified required physical properties. The search engine generates a solution space from which an optimal plan is selected. The solution space is defined by a set of rules and search heuristics provided by the DBI. The rules are used to generate solutions and the search heuristics guide the search engine to produce more promising solutions rather than all solutions.

The database query is represented as a query tree containing one or more expressions. An expression contains an operator having zero or more inputs that are expressions. The query optimizer utilizes two types of expressions: logical expressions, each of which contain a logical operator; and physical expressions, each of which contain a physical operator specifying a particular implementation for a corresponding logical operator. An implementation rule transforms a logical expression into an equivalent physical expression and a transformation rule produces an equivalent logical expression. The database query is initially composed of logical expressions. Through the application of one or more implementation and transformation rules, the logical expressions in the database query are transformed into physical expressions resulting in a solution.

In order to prevent the generation of redundant expressions, each rule is classified as being context-free or context-sensitive. A context-free rule is applied once to an expression, while a context-sensitive rule is applied once to an expression for a particular optimization goal.

A search data structure is used to store the expressions that are generated during the search process including those that are eliminated from consideration. The search data structure is organized into equivalence classes denoted as groups. Each group represents expressions that are equivalent to one another. Equivalence in this sense denotes those expressions that contain semantically equivalent operators, have similar inputs, and require the same characteristic inputs and produce the same characteristic outputs (otherwise referred to as group attributes). The set of characteristic inputs represent the minimum number of values required for the expression's operator and for any input expressions associated with it. The set of characteristic outputs represent the minimum number of values that the expression supplies to any parent expression associated with the expression.

Each group consists of one or more logical expressions, zero or more physical expressions, zero or more plans, and zero or more contexts. The expressions contained in a group are semantically equivalent to one another. A plan exists for each optimization goal and represents one particular expression. A context represents plans having the same set of required physical properties. By explicitly distinguishing between plans and physical expressions, multiple plans can be generated from the same physical expression given different required physical properties.

Initially the group attributes for each logical expression of the input query are determined and used to store each expression in an appropriate group in the search data structure. As the optimizer applies rules to the logical expressions, additional equivalent expressions, plans and groups are added. The group attributes of the newly generated expressions are computed in order to determine whether a duplicate of the newly generated expression is stored in the search data structure. A duplicate expression is one that has the same operator, number of inputs, ordinality of inputs, and group attributes. Duplicate expressions are not inserted into the search data structure.

The search engine utilizes a search procedure that generates a solution by partitioning the database query into one or more subproblems where each subproblem can contain one or more expressions. Some of the subproblems form a subtree including other subproblems as inputs. Each subproblem has an associated set of required physical properties that satisfies the constraints imposed by its associated parent subproblem's required physical properties. A solution to each subproblem is generated in accordance with an order that generates a solution for each input subproblem before a solution for its associated parent subproblem is generated. The solution for the database query is then obtained as the combination of the solutions for each of the subproblems.

The search procedure utilizes a branch and bound technique for generating solutions for each subproblem. An initial solution is obtained for each subproblem that has an associated cost which is then used as an upper bound for considering other candidate solutions. Additional solutions whose associated costs exceed the upper bound are eliminated from consideration. The solution having the lowest cost is selected as the optimal solution.

The cost associated with each expression is determined as a function of a six-fold criteria. Each criterion is weighed in accordance with the context of the expression and the user's particular computing environment. As such, the weights are adaptive, not static. In this manner, the cost can represent a more accurate estimate of the computational expense associated with executing an expression.

A plan is generated through the application of one or more rules to a logical expression. Each rule has a pattern and a substitute. A pattern is the before expression that is matched with the expression that is being optimized. A substitute represents a semantically equivalent expression that is generated by applying the rule. A rule's pattern matches an expression when the expression contains the same operators in the same positions as the rule's pattern. Prior to applying a rule to an expression, all possible bindings that match a rule's pattern are determined. The purpose of a binding is to find all possible expressions that can match a rule's pattern in order to generate every possible equivalent expression.

An expression in the search data structure is stored with pointers representing each input, if any. Each pointer has a link mode that allows it to reference either the group associated with the input or a particular input expression in the group. When a pointer's link mode is in memo mode, each pointer addresses the group of each input. When the link mode is in binding mode, each pointer addresses a particular expression in the input's group.

In binding an expression that has inputs, the link mode of the expression is set to binding mode. The input pointers of the expression are set to address a particular input expression stored in the associated group, thus forming a specific subtree. Further subtrees or bindings are formed by incrementing the input pointers appropriately to form other subtrees representing a different combination of the input expressions.

The DBI contains search heuristics in the form of guidance methods that select a set of rules for use in generating a plan for each subproblem. A OnceGuidance guidance method is used to prevent the needless generation of redundant expressions that result from the subsequent application of a rule to the rule's substitute. The OnceGuidance guidance method is used in certain cases to select a set of rules that are applicable to a rule's substitute without including those rules that will regenerate the original expression.

The search engine utilizes a series of tasks to implement the search procedure. Each task performs a number of predefined operations and schedules one or more additional tasks to continue the search process if needed. Each task terminates once having completed its assigned operations. A task stack is used to store tasks awaiting execution. The task stack is preferably operated in a last-in-first-out manner. A task scheduler is used to pop tasks off the top of the stack and to schedule tasks for execution.

A garbage collection task is scheduled whenever two groups of the search data structure are merged. The merger of two groups occurs as a result of the application of certain rules, such as the "elimination groupby" rule. In this case, the elements of one group is merged with the elements of a second group. The first group obtains the group identifier of the second group. The garbage collection task is then scheduled to update any references to the first group by any of the expressions in the search data structure and to eliminate any duplicate expressions in the merged groups.

In a preferred embodiment, the query optimizer performs multiple optimization passes. A first pass, using a certain set of implementation rules, is used to generate a first solution having a cost that is used as a threshold in subsequent passes. In one or more subsequent passes, a set of both implementation and transformation rules is applied to generate one or more additional plans each of which has a cost that does not exceed the threshold.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
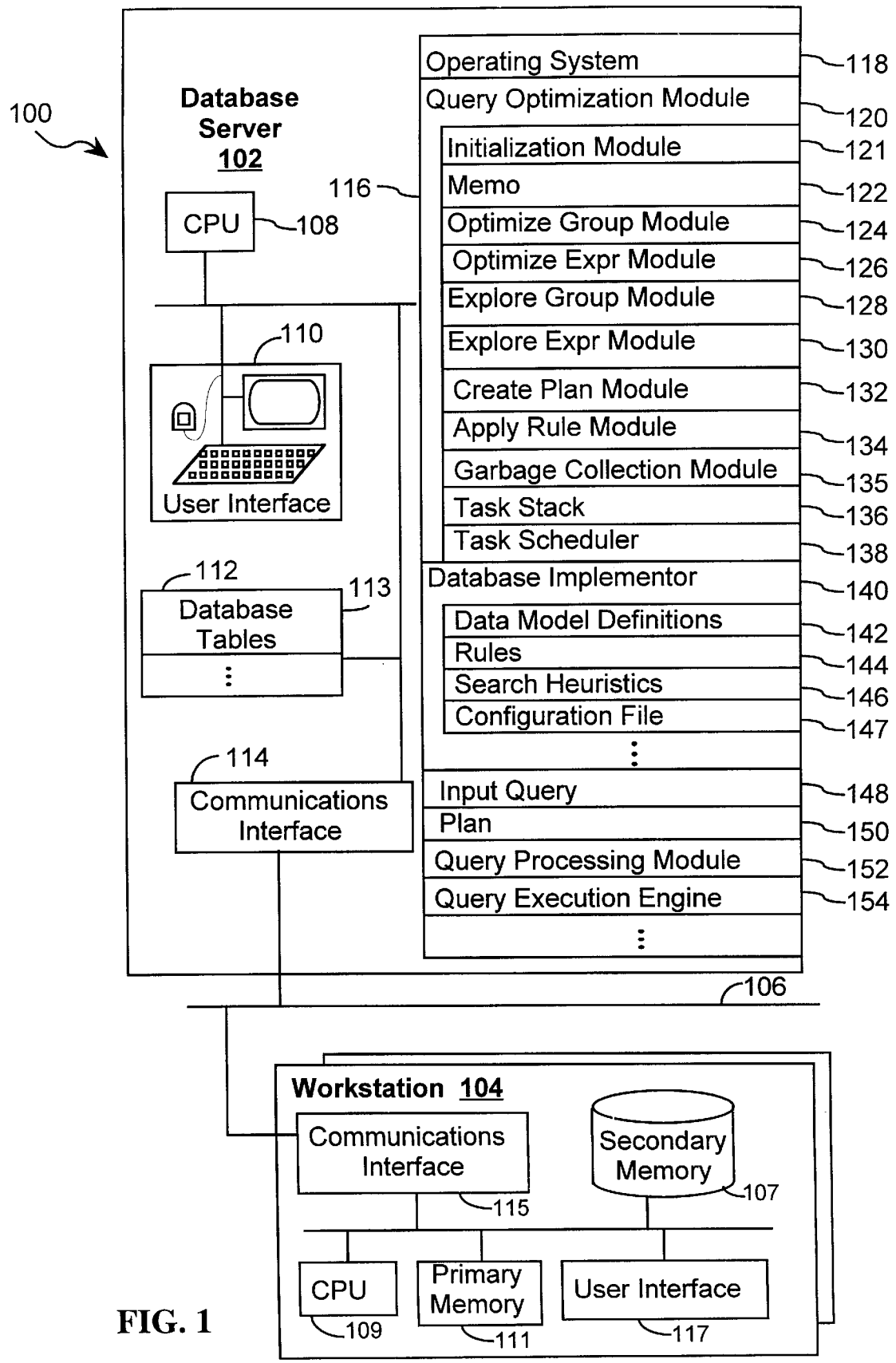
FIG. 1 is a block diagram of a computer system incorporating a preferred embodiment of the present invention.

Operation of the present invention will be explained by first giving an overview of how the present invention differs from the prior art Tandem query optimizer discussed in the background section of this document. The overview is then followed by a detailed explanation of the improved system and method.

Overview of Improved Query Optimization System and Method

The query optimization system and method of the present invention has many similarities to the prior art Tandem query optimizer. There are several improvements which will be described below.

The first improvement pertains to the criteria for determining redundant expressions. Previously, the search data structure contained only those expressions that were unique. Uniqueness was determined by a criteria that included in part the particular expression and its input expressions. However, each expression can differ with respect to its characteristic inputs and characteristic outputs (otherwise referred to as group attributes). By not considering an expression's characteristic inputs and outputs, an expression can be erroneously considered the duplicate of another expression that produces a different result. Hence, it is more accurate to incorporate an expression's characteristic inputs and outputs in a criteria that determines unique expressions.

Furthermore, this difference effects the cost that is associated with an expression. A lower or higher cost can be associated with a similar expression having different group attributes. An expression's cost is used by the search procedure to determine whether to prune or to consider the expression as part of a plan. By considering these expressions duplicates of one another, the optimizer eliminated the opportunity to generate a potentially lower cost plan or has inaccurately represented the expression's cost.

The first improvement determines each expression's group attributes which is used to store each expression in the search data structure. When a new expression is generated, it is inserted into the search data structure only if a semantically equivalent expression having the new expression's group attributes is not currently stored in the search data structure.

The second improvement pertains to the binding of input expressions of a parent expression. Previously, a binding allocated at runtime additional memory space to formulate each new expression that was bounded to a rule's pattern. This incurred the additional computational expense for copying the expression into the runtime data structure, linking them together to formulate the new expression, and eventually releasing the runtime space. This overhead increases combinatorially as the number of alternative solutions that are stored in the search data structure increases with the application of each rule.

The second improvement utilizes the existing input pointers stored in the search data structure. Typically, each expression has a pointer that references its inputs by their associated group. The improvement associates a link mode with the pointer that can take on two values: binding mode and memo mode. In binding mode, the pointer addresses a particular logical expression in the group of the input. In memo mode, the pointer addresses the group of a particular input. When a binding occurs, the link mode of each input associated with a bound parent expression is switched to binding mode in order to bind a particular input expression as a particular input. When binding is completed, the input pointers link mode is restored to memo mode and the input pointer addresses the group of the input. In this manner, no additional memory expense is incurred.

The third improvement pertains to the cost associated with an expression. As the optimizer is searching for the optimal plan, the cost associated with an expression is used as a factor for pruning the search. Previously, the cost was weighed in accordance with an objective criteria that did not consider the context of the expression. The third improvement utilizes adaptive weights that tailor an expression's cost in accordance with a criteria related to the expression's context and the particular application's computing environment.

The fourth improvement pertains to the addition of a Garbage Collection task that updates references in the search data structure of a group that has been merged with another group. The application of certain rules require that two groups merge. When two groups are merged, each group's group attributes, expression lists, and so on are integrated. Typically, the group with the higher group identifier is merged into the group with the lower group identifier. References within the search data structure that refer to the group with the higher group identifier require updating to reflect the lower group identifier. In addition, duplicate expressions and plans in the merged group need to be eliminated. The Garbage Collection task of the present invention performs the required reference updating and duplicate expression elimination. This task is scheduled to execute immediately after the groups are merged.

The fifth improvement pertains to a new guidance method that eliminates the repeated application of certain rules that result in generating redundant expressions. The new guidance method is referred to as OnceGuidance and is used to deter the application of a rule to a rule's substitute when the rule causes the regeneration of the original expression.

System Architecture

Referring to FIG. 1, there is shown a computer system 100 for storing and providing user access to data in stored databases. The system 100 is a distributed computer system having multiple computers 102, 104 interconnected by local area and wide area network communication media 106. The system 100 generally includes at least one database server 102 and many user workstation computers or terminals 104.

In the preferred embodiment, the database server 102 can be a SQL database engine that manages the control and execution of SQL commands. The workstation computers 104 pass SQL queries to the SQL database engine 102. A user associated with a workstation computer 104 can transmit a SQL query to retrieve and/or modify a set of database tables 113 that are stored in the database server 102. The SQL database engine 102 generates an optimized plan for executing the SQL query and then executes the plan.

The database server 102 includes a central processing unit (CPU) 108, primary memory 116, a secondary memory 112, a communications interface 114 for communicating with user workstations 104 as well as other system resources not relevant here. The secondary memory 112 is typically magnetic disc storage that stores database tables 113. It should be noted that when very large databases are stored in a system, the database tables will be partitioned, and different partitions of the database tables will often be stored in different database servers. However, from the viewpoint of user workstation computers 104, the database server 102 appears to be a single entity. The partitioning of databases and the use of multiple database servers is well known to those skilled in the art.

The primary memory of the database server 102 can contain the following:
  an operating system 118;
  a query optimization module or query optimizer 120 that contains data structures and modules for generating a plan that optimizes the input query. The query optimizer can contain the following:
    an initialization module 121;
    a search data structure 122, denoted as Memo, that stores groups of semantically equivalent expressions;
    an Optimize Group task module 124 that obtains a plan for a particular group;
    an Optimize Expression task module 126 that determines a set of rules for use in generating one or more plans for a particular logical expression;
    an Explore Group task module 128 that determines whether a particular group requires exploration;
    an Explore Expression task module 130 that determines a set of transformation rules for generating one or more equivalent logical expressions;
    a Create Plan task module 132 that obtains plans for an expression and its inputs;
    an Apply Rule task module 134 that performs the application of one or more rules to an expression;
    a Garbage Collection task module 135;
    a task stack 136 that stores one or more tasks generated by the query optimizer that are pending execution;
    a task scheduler 138 that manages the execution of the tasks on the task stack 136;
  a database implementor (DBI) 140 which is a user-defined set of procedures that define a data model and which can containing the following:
    data model definitions 142;
    rules 144 that specify the possible mappings to generate additional semantically equivalent expressions;
    search heuristics 146 that control the search strategy; and
    a configuration file 147;
  an input query 148 to be optimized;
  a plan 150 that is best suited for implementing the input query;
  a query processing module 152 that processes the input query and produces an optimal plan for implementing the input query; and
  a query execution engine 154 that implements the optimal plan.

User workstations 104 typically include a central processing unit (CPU) 109, primary memory 111, a communications interface 115 for communicating with the database server 102 and other system resources, secondary memory 107, and a user interface 117. The user interface 117 typically includes a keyboard and display device, and may include additional resources such as a pointing device and printer. Secondary memory 107 can be used for storing computer programs, such as communications software used to access the database server 102. Some end user workstations 104 may be "dumb" terminals that do not include any secondary memory 107, and thus execute only software downloaded into primary memory 111 from a server computer, such as the database server 102 or a file server (not shown).

GLOSSARY

To assist the reader, the following glossary of terms used in this document is provided.

Relational Expression: A relational expression is one that produces a table as its output, such as a join or scan. Relational expressions differ from value expressions that contain arithmetic operators and produce a value as an output. A relational expression can be a physical expression or a logical expression or both.

Logical Expression: A logical expression contains a logical operator of a certain arity (having a required number of inputs) and whose inputs are logical expressions. The arity of the logical operator is $\geq 0$. The inputs are also referred to as children or input expressions.

Physical Expression: A physical expression consists of a physical operator of a certain arity and whose inputs are physical expressions. Similarly, the arity of the physical operator is $\geq 0$. The inputs are also referred to as children or input expressions.

Table Expression: A table expression is a relational expression that produces a table or set of rows. Examples of table expression operators include Scan (or Retrieve), Join, Union, and Group By.

Logical Operator: A logical operator represents an implementation-independent operation (e.g., join or scan).

Physical Operator: A physical operator specifies a particular implementation method or procedure (e.g., hashjoin, mergejoin, etc.).

Expression tree: An expression tree corresponds to a relational expression having one or more logical or physical expressions. The expression tree consists of one or more nodes, each node is classified as a logical expression or a physical expression. Each node can contain zero or more inputs, each input being a relational expression. The expression tree consists of one or more levels, each level containing nodes that are inputs to a node of a preceding level. The root node represents a relational expression having the top-most operator and positioned in the first level.

Plan: A plan is an expression tree that consists solely of physical expressions. A plan is associated with a particular optimization goal and is considered complete when an associated cost and required physical properties is assigned to it. The term plan and solution are used in this document interchangeably.

Query tree: A query tree is an expression tree that corresponds to the input query that is to be optimized. The query tree contains one or more nested logical expressions.

Optimization rule: An optimization rule defines how the optimizer is to transform the input query into other semantically equivalent forms. In this application, there are two types of optimization rules: transformation rules and implementation rules. A transformation rule produces equivalent logical expressions and an implementation rule produces equivalent physical expressions.

Transformation rule: A transformation rule transforms a logical expression into a semantically equivalent logical expression (e.g., join associativity and commutativity).

Implementation rule: An implementation rule transforms a logical expression into a semantically equivalent physical expression by substituting one or more logical operators in the logical expression with physical operators (e.g., join may be implemented by mergejoin). The repeated application of implementation rules results in a plan that consists only of physical expressions.

Pattern and Substitute: An optimization rule consists of a pattern and a substitute, both of which are expression trees. The pattern is the before expression that is matched with the expression that is being optimized. The substitute represents the semantically equivalent expression that is generated by applying the rule. A rule's pattern matches an expression when the expression contains the same operators in the same position as the rule's pattern.

Cut operator: A cut operator is an input to a rule's pattern that can be matched to any operator.

Tree operator: A tree operator is an input to a rule's pattern that is matched to an entire expression tree.

Memo: A memo is a search data structure used by the optimizer for representing elements of the search space. The Memo is organized into equivalence classes denoted as groups. Each group consists of one or more logical and physical expressions that are semantically equivalent to one another. Expressions are semantically equivalent if they produce the identical output. Initially each logical expression of the input query tree is represented as a separate group in Memo. As the optimizer applies rules to the expressions in the groups, additional equivalent expressions and groups are added. Each group also contains one or more plans and contexts. A context represents plans having the same optimization goal.

Physical properties: A physical property specifies the manner for representing the output of an expression. Typically, the physical property is used to indicate a sort order (e.g., sorted by (a,b)), a compression status, or used to indicate partitioning for parallel and/or distributed systems.

Optimization goal: An optimization goal represents the required physical properties that are associated with an expression and a cost. The terms "optimization goal" and "required physical properties" are used interchangeably for those instances when the optimization goal is not associated with a cost.

The Query Processing System

Figure 2:
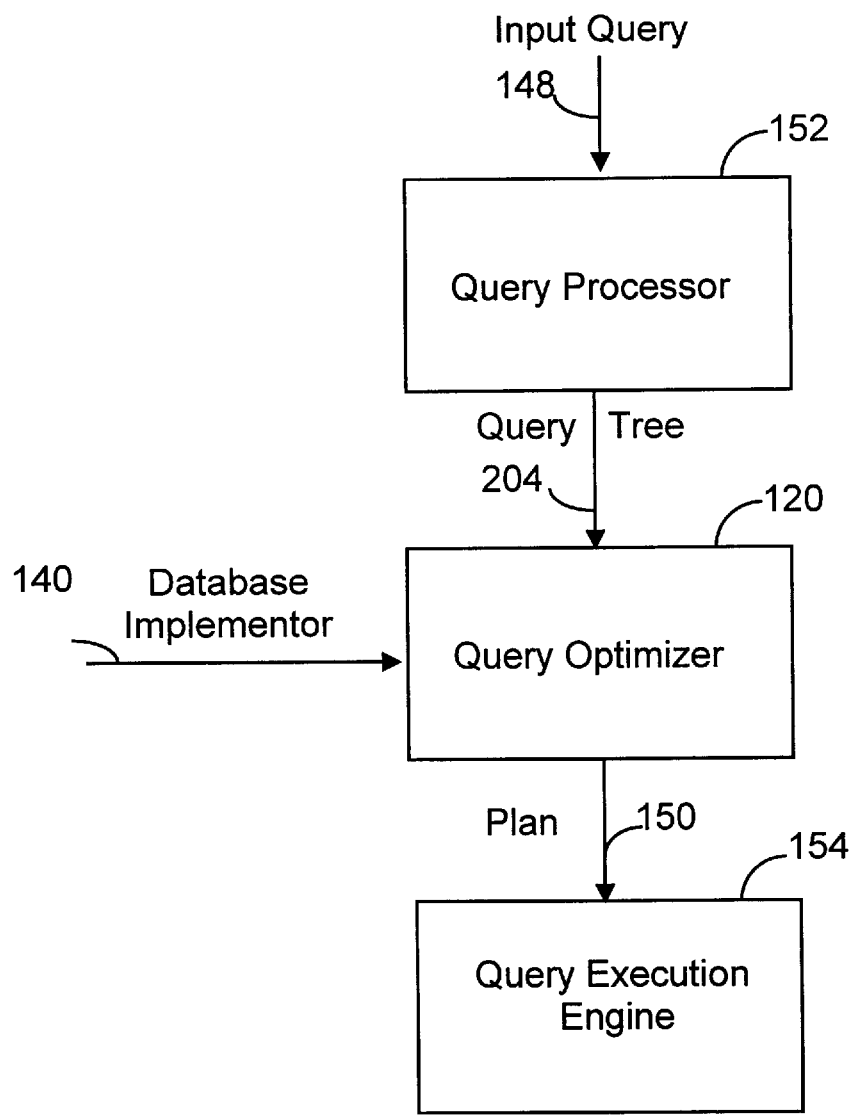
FIG. 2 is a block diagram of the processing modules that are used to execute a database query in a preferred embodiment of the present invention.
Figures 3A, 3B:
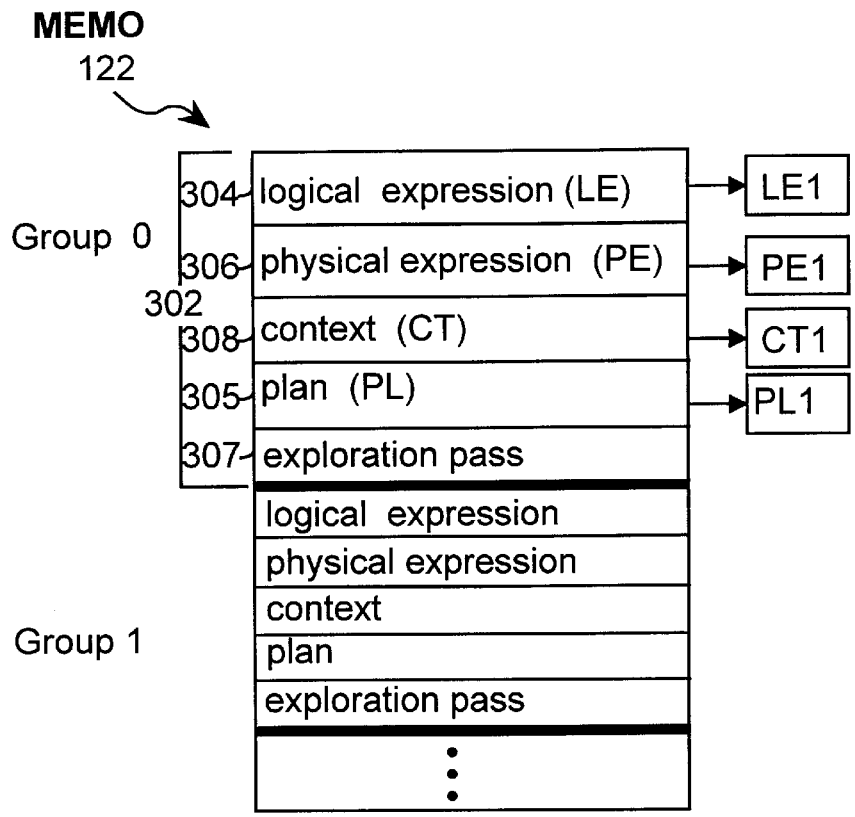
FIGS. 3A–3E are block diagrams of the Memo search data structure in a preferred embodiment of the present invention.
Figure 3C:
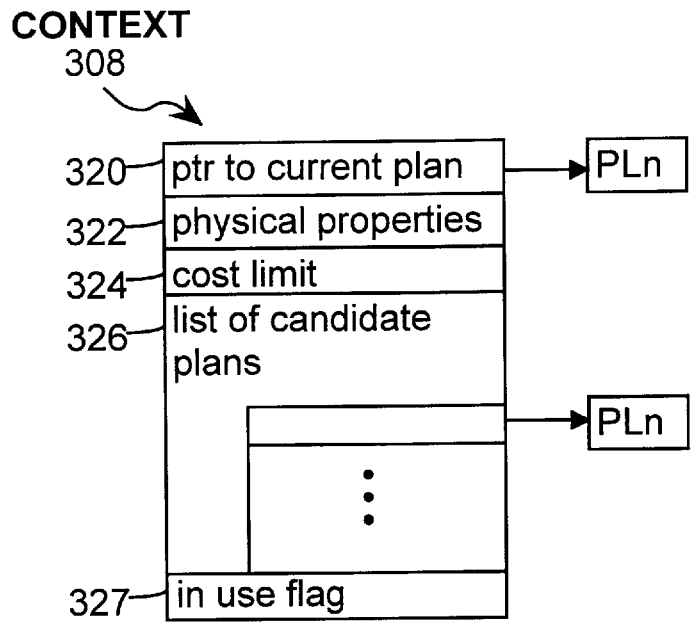
Figure 3D:
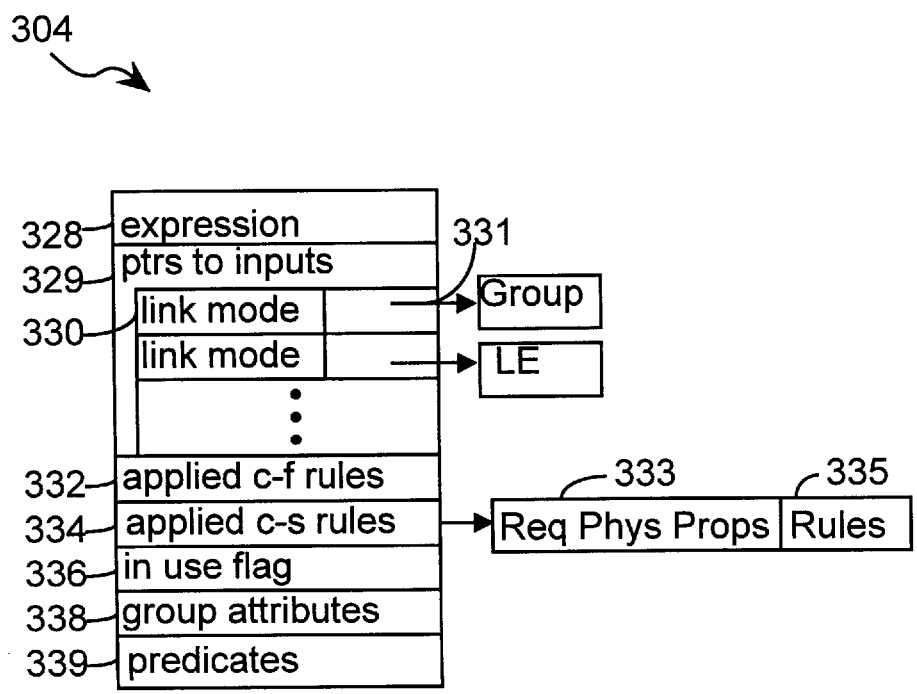
Figure 3E:
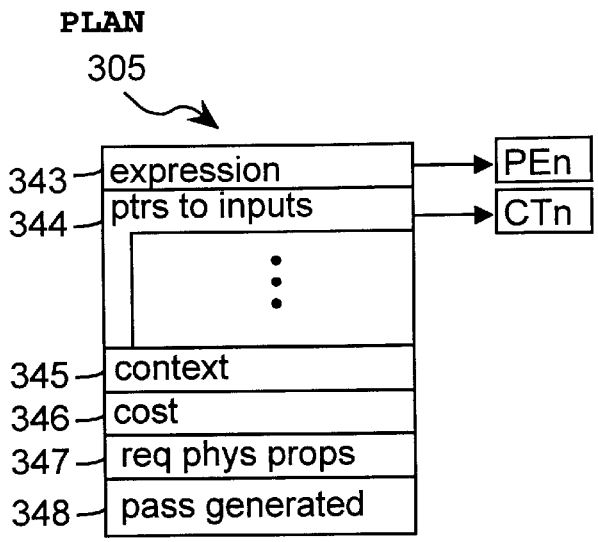
Figure 4:
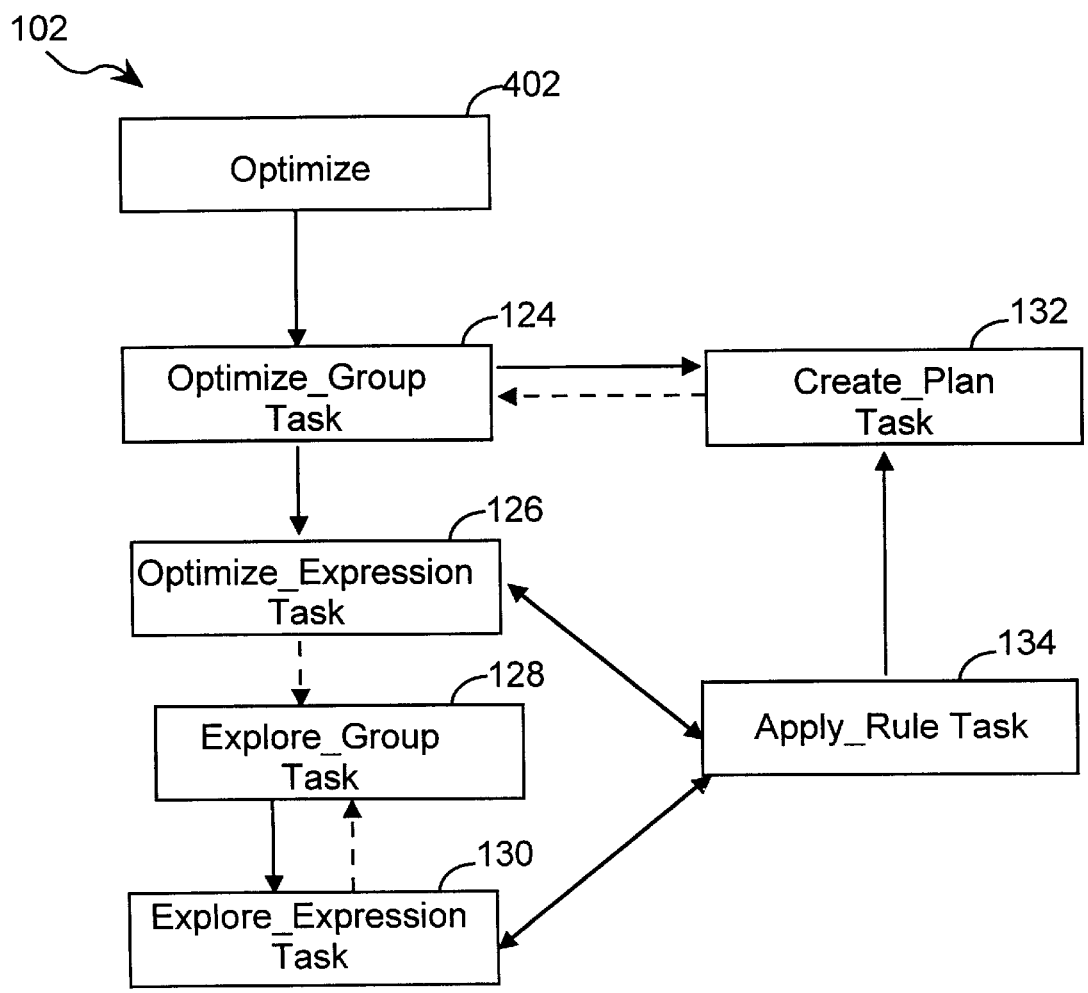
FIG. 4 is a block diagram of the task structure in a preferred embodiment of the present invention.
Figure 5:
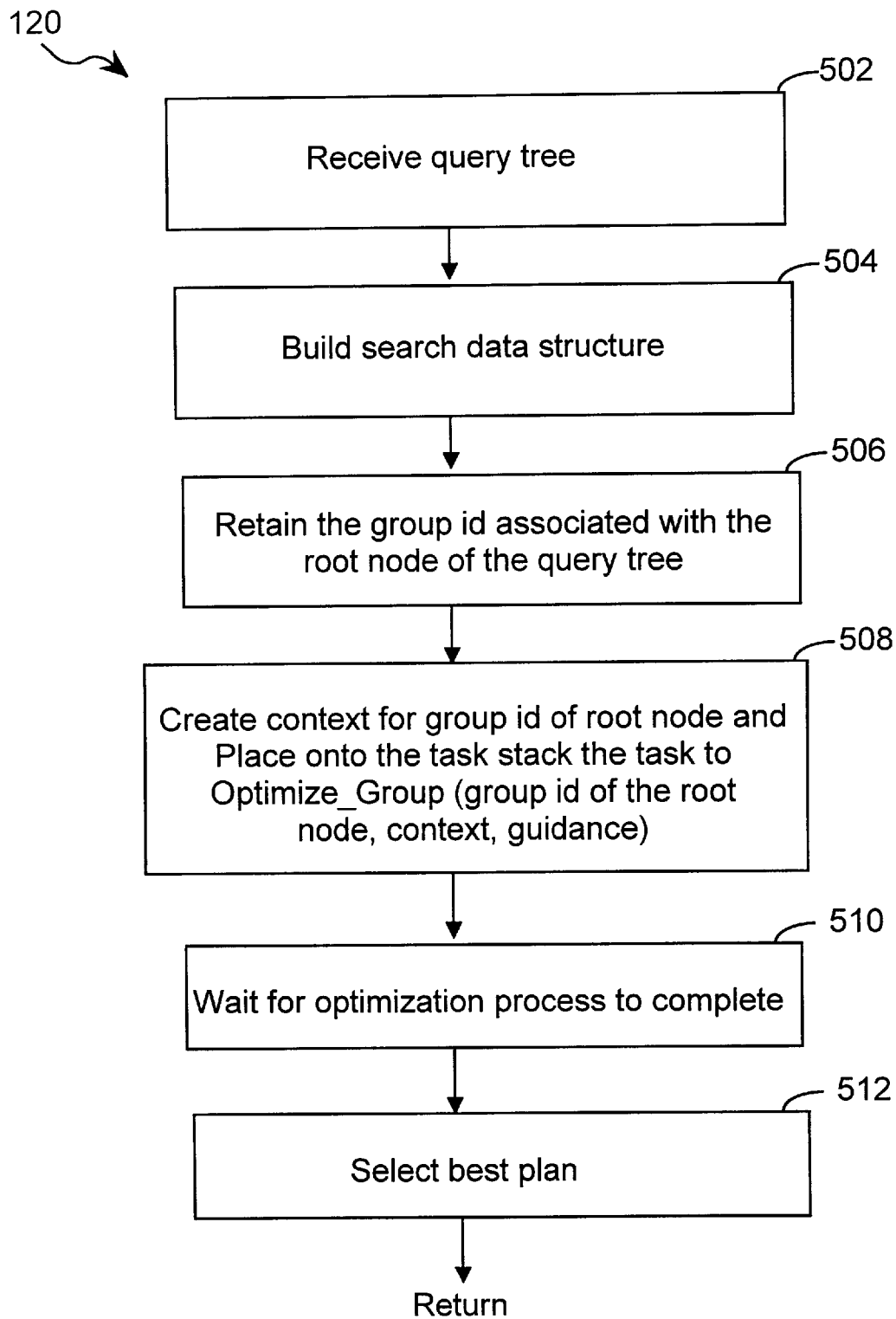
FIG. 5 is a flow chart of the preferred embodiment of the optimize procedure of the present invention.

FIG. 2 illustrates the execution path of a database query in the preferred embodiment of the present invention. Initially, a user transmits to the database server 102 an input query 148 instructing the database server 102 to perform certain operations. The input query 148 is typically written in a query processing language such as SQL (Structured Query Language). The input query 148 is processed by a query processor 152 that includes a parser (not shown) which converts the input query 148 into an internal representation referred to as a query tree 204. The query tree 204 represents the expression to be optimized along with any required physical properties. The query processor 152 structures the query tree 204 in a manner that is beneficial for the query optimizer 120.

The query processing system 152 utilizes a query optimizer 120 to generate one or more alternate execution plans. Associated with each plan is a cost for executing the plan. The query optimizer 120 chooses the plan 150 having minimal cost which is used by the query execution engine 154 to execute the input query 148.

Database Implementor

The query optimizer of the present invention is composed of a search engine and a database implementor (DBI) 140. The search engine executes a series of tasks that generate one or more plans to implement the input query 148. The DBI 140 provides the data model definitions 142, rules 144, and search heuristics 146 that guide the manner in which the tasks generate plans. The DBI 140 is provided by the user and can vary for each application. By organizing the query optimizer in this manner, the optimizer is made extensible and independent of a particular data model. Additional operators and rules can be added to the DBI 140 without effecting the search engine. Likewise, the search engine can be applied to a variety of data models without altering its structure.

The Database Implementor (DBI) 140 is a user-defined set of data definitions and methods that define a user's data model. The DBI can contain three parts: (1) the data model definitions 142 that list the operators and methods of the data model that are to be considered when constructing and comparing plans; (2) rules 144 for transforming the expressions in the query tree into one or more plans; and (3) search heuristics 146 that efficiently guide the search process to generate viable plans.

In the preferred embodiment, the data model distinguishes between operators (or logical expressions) and methods (or physical expressions). An operator corresponds to a primitive provided by the data model. Examples of operators include join, intersection, and select. A method is a computer procedure that implements the operator. For example, hashjoin and mergejoin are methods that implement the operator join. An operator can often be implemented using several alternative methods.

Operators and methods are defined by data declarations. Furthermore each method has an associated code segment that implements the method. The following example illustrates a data declaration used in a particular data model.

% operator 2 join (1)

% method 2 hash_join loops_join cartesian_product (2)

In this example, the keyword operator and method are followed by a number to indicate the arity and are followed by a list of associated operators or methods. The operator join has an arity of 2 thereby requiring two inputs. The method declaration indicates that the three methods hash_join, loops_join, and cartesian_product have an arity of 2.

The second part of the DBI contains the transformation and implementation rules. A transformation rule defines a legal transformation of an expression. An implementation rule defines the correspondence between an operator and a method. A user can specify the rules by data definitions as illustrated by the following example.

$$\text{Join } (cut_1, cut_2) \rightarrow! \text{ Join } (cut_2, cut_1) \quad (3)$$

$$\text{Join } (cut_1, cut_2) \text{ by Hash\_Join } (cut_1, cut_2) \quad (4)$$

The first line of this example defines the join commutativity transformation rule. The arrow is used to indicate the legal direction of the transformation. In this example, the arrow combined with the exclamation mark is used to indicate that the rule is applied only once since applying a join commutativity rule twice results in the original form. The second line of this example defines an implementation rule specifying that the Hash_Join method is a suitable implementation of a Join.

The expression on the left side of a rule is considered the pattern and the expression on the right side is the substitute. The inputs of the rule's pattern are represented by a special operator called a "cut" operator. A cut operator matches any other expression. The pattern indicates a logical operator, such as join, having a prescribed form, such as two inputs $cut_1$ and $cut_2$ and in a particular order where input $cut_1$ is considered the first input and input $cut_2$ is considered the second input. The substitute indicates either a logical or physical operator having a prescribed form. In the above example, the substitute for the transformation rule is a join operator having the inputs in the reverse order as the pattern. The substitute for the implementation rule specifies the hashjoin operator having two inputs and in a particular order.

A rule is applied by matching the rule's pattern with an expression and producing a new expression having the form specified by the substitute. Each operator in the expression is matched with each operator in the pattern in the same position. For example, when the Join commutativity rule (specified in equation (3) above) is applied to expression Join (scan $t_1$, scan $t_2$), the Join operator of the expression is matched with the Join operator of the rule's pattern. The expression scan $t_1$ is matched with the first input and the expression scan $t_2$ is matched with the second input. The result of the application of the rule is an expression having the form of the substitute which is Join (scan $t_2$, scan $t_1$).

The third part of the DBI consists of search heuristics that guide the optimizer's search. The search heuristics can contain the following:

- a createContextForChild method that generates a context (part of the search data structure which is discussed below) for an expression's input with selected required physical properties that are a subset of a parent expression's required physical properties;
- an enable method that indicates the particular optimization pass or passes in which a rule can be applied;
- match methods that match a particular operator with a rule's pattern;
- cost functions that associate a cost with a particular expression;
- promise functions that reorder the rules to be applied on expressions, or suppress the application of rules on certain expressions;
- cutoff methods that limit the number of rules applied on a certain expression; and
- guidance methods that generate information pertaining to the selection of rules for subsequent rule applications.

The cost functions are used to generate a cost for a particular operator associated with an expression. The cost represents an estimated amount of computational expense associated with executing an expression. Preferably, six factors are considered. Each factor has a weight associated with it for biasing each factor in accordance with a prescribed criteria. The prescribed criteria includes the particular computing environment of the application and the operator type. The cost function returns the final cost which is an aggregate of each of the six weighted factors.

In the preferred embodiment of the present invention, the cost weights are adapted for a particular user environment. A configuration file 147 is used to describe the performance characteristics of the user's computing environment. This information is then used to adapt the cost weights to the particular user environment in order to more accurately estimate the operator's computational expense.

The cost is computed as a combination of six factors which are as follows:

1. CPU cost: represents the cost for executing an estimated number of CPU instructions associated with the expression's operator;
2. Random I/O cost: represents the cost-for executing an estimated number of random I/O instructions associated with the expression's operator;
3. Sequential I/O cost: represents the cost for executing an estimated number of sequential I/O instructions associated with the expression's operator;
4. Message cost: represents the cost for transmitting an estimated number of messages that should be exchanged for establishing the data associated with the expression;
5. Memory cost: represents the cost for accessing an number of bytes of main memory during the execution of the expression; and
6. Temporary table cost: represents the cost for creating tables storing intermediate results where the tables are of an estimated number of bytes of disk storage.

A cost vector is typically used to represent each of the above mentioned six factors for each expression. In addition a set of cost weights is used to weigh each cost in the cost vector appropriately. The cost weights are tailored for a particular application's environment and for the context of an expression.

The DBI includes a configuration file 147 that contains information pertaining to the computing environment associated with the application. The configuration file 147 can include information such as, but not limited to, the performance characteristics of the workstation used by the user, the performance characteristics of the particular mass storage system used by the application, and so on.

During the initialization phase of the optimizer, the optimizer's initialization module 121 reads the user configuration file 147 and determines an appropriate set of cost weights based on the information contained in the file 147. These cost weights are then used to adapt the estimated cost of the particular computing environment corresponding to the user's application.

Further, when the cost of an expression is needed, the cost function considers the particular expression and adjusts the cost weights accordingly. For example, if the expression utilizes a Hashjoin operator, the cost function can adjust the cost weights such that the memory consumption cost is increased since the Hashjoin operation is extremely memory intensive.

The enable method, match methods, promise functions, cutoff methods, and guidance methods are used to determine the rules that are to be applied to a particular expression. The enable method determines if the rule is to be considered for the particular pass. Match methods are used to match an operator with a rule's pattern. Promise functions have an associated value that indicate the usefulness of a rule in a particular context. The cutoff methods also have an associated value that is used to determine which rules are to be applied to a particular expression. A further elaboration of these concepts will be described in more detail below.

The guidance methods produce guidance structures which are heuristics that are passed from one task to another and are used to select rules which will generate more promising solutions. The heuristics capture knowledge of the search process which is passed onto subsequent tasks in order to eliminate generating unnecessary and duplicate expressions. The optimizer of the present invention utilizes a task structure where each task operates in an independent manner. As such, there is no communication between tasks. The guidance structures serve as a means to pass search information from one task to subsequent tasks in order to effect future search activity.

Guidance is provided at different points in the search process. (For the purpose of this application, the terms guidance and guidance structure are used interchangeably.) The search process entails an exploration phase and an optimization phase (which is explained in more detail below). During the optimization phase, plans are generated through the application of rules for one or more expressions. Guidance is provided to efficiently select those rules that will produce more promising plans in light of the previous search activity. This guidance (e.g., optGuidance) is provided after an application of a rule creates a new logical expression and when plans are sought for an expression's children (e.g., optInputGuidance). In the exploration phase, all possible logical expressions that match a rule's pattern are generated. Guidance is provided during this phase in order to eliminate the generation of unnecessary logical expressions in light of previous transformations. This guidance is provided whenever a group (e.g., explInputGuidance) or an expression (e.g., explGuidance) is explored.

For example, in exploring an expression, guidance can be provided to Indicate that a join commutivity rule should not be applied twice to an expression. Further, when exploring a join pattern, it may be unnecessary to apply a rule that transforms a union operator or a scan operator into a logical expression that does not involve joins. Guidance can also be used to enable rules that are not usually enabled, such as a rule that generates an unusual physical expression such as an input expression using a bitmap-index scan.

Figure 13A:
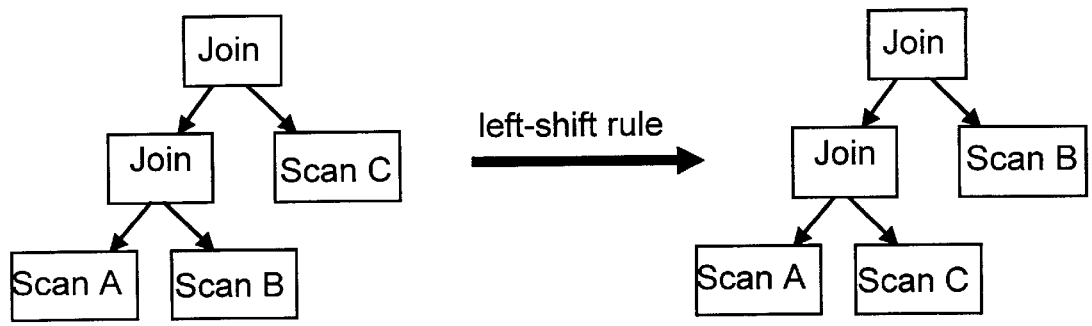
FIGS. 13A–13B illustrate an example of the application of the Left-Shift rule to an expression matching a rule's pattern and to the expression matching the rule's substitute.
Figure 13B:
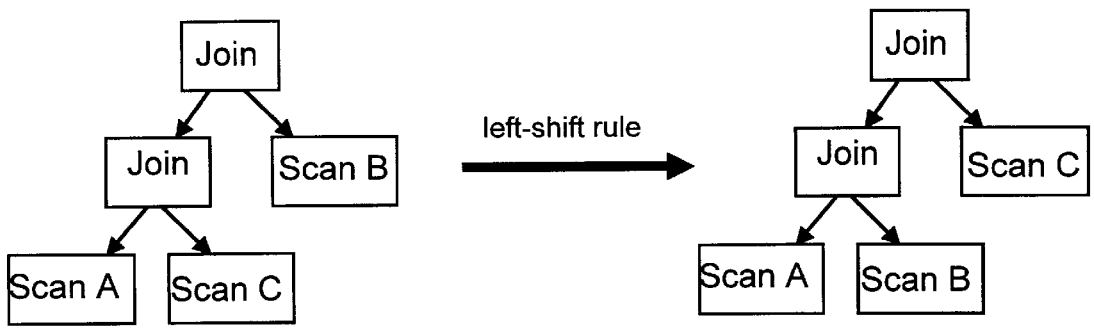

A OnceGuidance guidance method builds a set of rules that are applicable to the substitute as well as the pattern of a rule. This is to prevent the application of certain rules on a substitute since the second application regenerates the original expression. Specifically, as shown in FIGS. 13A–13B, when the Left Shift rule is applied to a pattern (FIG. 13A) and then to the substitute (FIG. 13B), the original expression is regenerated. Since this expression has already been considered by the optimizer, it need not be regenerated.

The OnceGuidance guidance method is used in certain portions of the optimizer. Rules are applied in the Apply_Rule task 134 (see FIGS. 10A–10B). After the application of the rule, the Apply_Rule task 134, in certain cases, can schedule an Explore_Expression task 130 or an Optimize_Expression task 126 (see FIG. 10B). Prior to scheduling either of these tasks, the expiGuidance method or the optGuidance method is invoked which returns the OnceGuidance guidance structure. The OnceGuidance guidance structure is passed to either the Explore_Expression task 130 or the Optimize_Expression task 126. Both of these tasks determine a suitable set of rules for application to the substitute expression (see FIGS. 7 and 9). The OnceGuidance guidance structure prevents the Left Shift rule from being included in the suitable set for the substitute expression.

Search Data Structure

In the preferred embodiment, the query optimizer utilizes a search data structure denoted as Memo. Memo is a search tree that is used to store expressions that are analyzed during the search. The Memo is organized into equivalence classes denoted as groups. Each group consists of one or more logical and physical expressions that are semantically equivalent to one another, one or more plans, one or more contexts, and an exploration pass indicator. Initially each logical expression of the input query tree is represented as a separate group in Memo. As the optimizer applies rules to the expressions, additional equivalent expressions, groups, contexts, and plans are added.

Referring to FIGS. 3A–3E, the Memo 122 consists of one or more groups 302, where each group 302 contains an array of pointers to one or more logical expressions 304, an array of pointers to one or more physical expressions 306, an array of pointers to one or more contexts 308, an array of pointers to one or more plans 305, and an exploration pass indicator 307. A logical expression, physical expression, context, and plan are described in more detail below. An exploration pass indicator 307 indicates for each pass whether or not the group has been explored. Preferably, the exploration pass indicator is a bitmap having n bits with one or more bits representing a particular pass and indicating whether or not exploration was performed in the pass.

Each logical expression 304 is represented as a data structure that stores the particular expression 328 and has pointers 331 associated with each input expression 329. Each pointer 331 has a link mode 330 that specifies the datum that the pointer addresses. Preferably, there are two link modes associated with an input expression: a memo mode and a binding mode. In memo mode, the pointer 331 identifies the group corresponding to the input expression. In binding mode, the pointer 331 identifies a logical expression that is part of a binding.

In addition each logical expression 304 has a bit map 332 that is used to specify the context-free rules that have been applied to the logical expression 304. There is also a list of pointers 334 to a data structure including the required physical properties 333 and context-sensitive rules 335 that have been applied to the logical expression 304. The list of context-sensitive rules 335 is preferably a bit map with one or more select bits indicating whether or not a particular context-sensitive rule has been applied to the logical expression 304. An in use flag 336 is also part of the logical expression 304 and when set, indicates that the logical expression is currently bound to a rule's pattern. The in use flag 336 is used to prevent a problem referred to as circular binding. In addition, each logical expression 304 stores its group attributes 338 and predicates 339.

Each physical expression 306 is represented as a data structure that stores the particular expression 311, the physical properties 312 associated with the expression, the cost 314 associated with the expression, and an array of pointers 318 to the groups of each input expression.

A plan 305 represents a physical expression 343 that is assigned required physical properties 347 and a cost 346 that is within the desired cost limit. The plan 305 also includes a pointer to a corresponding context 345, pointers to the contexts of each of its inputs 344, and the pass in which the plan was generated 348.

A context 308 is a data structure that represents one or more plans for a particular group having similar or compatible required physical properties. A context 308 includes a pointer 320 to the current plan, required physical properties 322, a cost limit 324, a list of candidate plans 326, and an in use flag 327. For a particular expression, there may be several plans that meet the cost limit 324. The list of candidate plans 326 includes a pointer to each of these plans. The current plan 320 is the candidate plan having the lowest cost. The in use flag 327 is used to indicate when a context is currently being optimized. This is used to avoid infinite recursion.

Group Attributes

Group attributes are associated with each table expression. The group attributes consist of a set of characteristic inputs and a set of characteristic outputs. The minimal set of characteristic inputs represent a set of values required for the expression's operator and for any level of input expressions associated with it. The minimal set of characteristic outputs represent a set of values that the expression supplies to any level of parent expressions associated with the expression.

The group attributes of an expression are determined by performing a dataflow analysis of the expression with respect to the expression tree that it is associated with. The dataflow analysis traverses the expression's expression tree in a top down manner to determine its characteristic inputs and in a bottom up manner to determine its characteristic outputs. Preferably, the dataflow analysis performs one pass through an expression tree. The expression tree is traversed in a top down manner and in a bottom up manner in order to formulate all possible characteristic inputs and outputs for each expression. Only those characteristic inputs and outputs that are absolutely needed by an expression are retained and those that are not necessary are eliminated.

This dataflow analysis is performed at several points in the optimization process. Initially, in an initialization phase of the optimizer, the group attributes of each table expression in the input query are determined and stored with it in the search data structure. Thereafter, as new expressions are generated from the application of the rules, the group attributes are determined based on the particular rule's pattern.

New expressions that result from the application of a single level rule pattern inherit the group attributes of the semantically equivalent expression that was used to generate the new expression. A single level rule pattern is one that has operators at one level in the pattern's expression tree. For example, the rule Join($cut_1$, $cut_2$)→Join ($cut_2$, $cut_1$), has a single level rule pattern. The application of this rule to a Join expression in group 2 results in a substitute expression that inherits the group attributes of group 2.

For multi-level rule patterns, leaf and root substitute expressions inherit the group attributes of the corresponding pattern expression. Non-leaf and non-root substitute expressions need to have their group attributes determined through the dataflow analysis. The dataflow analysis is performed on the rule's substitute for each node that is not a cut operator in order to determine the expression's characteristic inputs and outputs. For example, the LeftShift rule, Join(Join($cut_1$, $cut_2$), $cut_3$)→Join(Join($cut_1$,$cut_3$), $cut_2$), is an example of a multi-level rule pattern. The second Join expression in the rule's substitute, Join($cut_1$,$cut_3$), is a non-leaf and a non-root substitute expression. As such, the group attributes of the substitute expression are determined through a dataflow analysis on the expression tree representing the rule's substitute. By contrast, the first Join substitute expression inherits the group attributes of the group associated with the first Join pattern expression.

Each table expression can receive one or more values as inputs from a child table expression and/or a parent table expression. These values can be any combination of the following:

1. External dataflow inputs: Input values that are supplied by the user, either in host variables, parameters, or as constants;
2. Implicit dataflow inputs: Input values that are sensed from the environment, such as the current time, user id, etc.;
3. Outer references: Input values that are produced in one table expression and referenced in another table expression in the same query; and
4. Internal dataflow inputs: Input values that are received by a table-expression operator from its children.

The characteristic inputs of an expression are the minimum set of any of the above mentioned input values that are required by the expression or by any level of its input expressions.

The characteristic outputs of an expression are then the minimum set of values that are supplied to its immediate parent, to another operator that belongs to the same expression tree as its parent, or are used as output values for the query.

Figure 14:
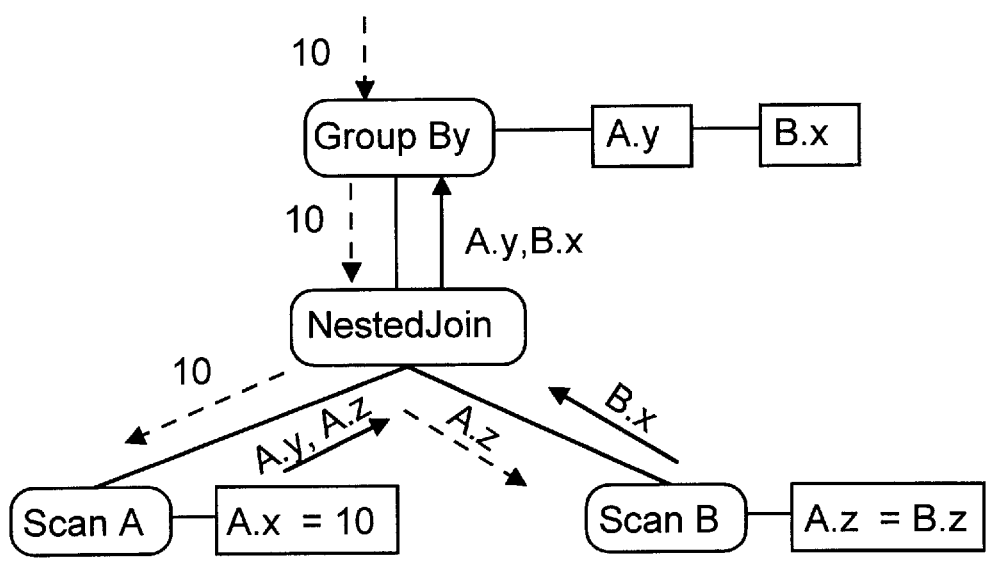
FIG. 14 illustrates the dataflow analysis used in determining group attributes for expressions in a query tree.

FIG. 14 is an example that illustrates the dataflow analysis used to determine the characteristic inputs and outputs of each expression in an input query. The GroupBy operator receives the external dataflow input value 10. It is supplied as an input to the NestedJoin which, in turn, provides it to the Scan A operator. The Scan A operator produces the values A.y and A.z as its outputs. The NestedJoin receives them as internal dataflow inputs. It supplies the value A.z as an external dataflow input to Scan B so that the predicate A.z=B.z can be evaluated. The operator Scan B produces the value B.x as its output. The NestedJoin receives it as a new dataflow input, in addition to the values A.y and A.z from Scan A. The GroupBy receives the values A.y, B.x from the NestedJoin as internal dataflow inputs.

Thus, each operator of each expression has the following characteristic inputs and outputs:

|  | Group Attributes | |
| --- | --- | --- |
| operator | Characteristic Inputs | Characteristic Outputs |
| GroupBy | 10 | Results of the query |
| NestedJoin | 10 | A.y,B.x |
| ScanA | 10 | A.y,A.z |
| ScanB | A.z | B.x |

The group attributes associated with an expression are used to detect if the expression is a duplicate expression that already resides in the search data structure. This use will be described in more detail below with reference to FIG. 10A.

Search Procedure

The query optimizer of the present invention utilizes a search procedure to generate a number of feasible solutions from which an optimal solution is selected. Initially a feasible solution is generated whose associated cost is used as an upper bound for searching for other solutions. The search continues generating other solutions eliminating those that have an associated cost that exceeds the upper bound. When the search has exhausted all candidate solutions, the solution having the lowest cost is selected as the optimal solution.

The search procedure generates a solution by partitioning the input query into one or more subproblems when the input query consists of nested expressions. An expression is defined recursively as containing an operator with zero or more inputs that are expressions. Each subproblem contains one or more expressions. The subproblems form a tree in which some of the subproblems are inputs to other subproblems. A solution for each input subproblem is generated before a solution for its associated parent subproblem is generated. Thus, the subproblems are analyzed in accordance with an order that traverses the subproblem tree in a bottom-up manner. Those subproblems not having inputs are analyzed first making it possible to graduate up the tree to subproblems utilizing these inputs.

The inputs are numbered such that the left-most input is considered the first input, the right-most input is considered the last input, and those inputs in between are numbered sequentially relative to the first and last input. The input subproblems are analyzed sequentially where the first input is analyzed first, the second input is analyzed next, and so on. Once all the subproblems are analyzed, a solution for the database query is obtained as the combination of the solutions for each of the subproblems.

For each subproblem for which a solution is desired, a set of rules is selected that is used to generate the solution space for the particular subproblem. The set of rules can consist of both context-free and context-sensitive implementation and transformation rules. These rules are used to generate one or more solutions for the particular subproblem. The choice of rules is selected so as to constrain the size of the solution space to feasible solutions rather than all possible solutions. This selection is guided by the various functions in the DBI (e.g., enable methods, guidance methods, promise functions, search heuristics, and cutoff functions).

Once the set of rules or solution space for a particular subproblem is determined, the search procedure employs a branch and bound technique to determine which solutions to generate. This search is performed for each subproblem for which a solution is sought. Solutions whose associated cost does not exceed an upper bound are generated while those that exceed this bound are pruned. This eliminates the number of solutions that need to be considered, thereby producing a more efficient search procedure.

The search procedure partitions the query tree into a number of subproblems based on the rules selected for transforming the expressions in the query tree into physical expressions. The search procedure starts at the root expression selecting one or more rules for transforming the logical operator included in the root expression into an equivalent physical expression. The root expression is often considered a subproblem. Based on the rule applied, the query tree is further partitioned into one or more subproblems where each subproblem contains expressions requiring equivalent physical expressions. Often each input to a rule is considered an additional subproblem. The input subproblem can then be partitioned further into additional subproblems based on the rules selected for application to the top expression contained in the subproblem.

Each subproblem can be optimized or explored. In optimizing a subproblem, one or more rules, including any combination of context-free/context-sensitive implementation/transformation rules are applied to one or more operators in the subproblem in order to generate a plan. By exploring a subproblem, one or more transformation rules are applied to one or more operators in the subproblem in order to generate additional equivalent expressions. Exploration typically occurs when the input to a rule specifies a particular operator rather than a cut or tree operator (the tree operator is described in detail below). Exploration is performed on a subproblem immediately preceding the optimization of the subproblem. This is done in order to produce equivalent expressions or groups that can be utilized in the optimization step. By performing explorations in this manner, only those equivalent expressions that will produce more promising solutions in the subsequent optimization are generated rather than all possible transformations.

The Memo search structure tracks each solution or plan considered by the search engine, even those that are eliminated from consideration due to their excessive cost. However, duplicate expressions can be generated during the search process. A redundancy check is performed before an expression is stored in the Memo search structure. This check eliminates the retention of duplicate expressions in the Memo search structure.

Multipass Optimization

In a preferred embodiment of the present invention, multiple optimization passes are performed. During the first optimization pass, only those rules that are necessary to generate a feasible plan with a reasonable cost are enabled. Typically, a subset of implementation rules are enabled. Where there exists multiple implementation rules for the same logical expression, the most economical rule which provides a reasonable cost limit is chosen. For example, among the join implementation rules, only the hashjoin rule might be enabled during the first pass. The nestedjoin rule, while providing a good cost limit, has the potential for increasing the search space since new expressions are added with join predicates. The mergejoin rule can be an expensive rule to enable since the children of the merge join are optimized for alternate orderings. Similarly, since transformation rules have the potential for increasing the search space without the added benefit of generating feasible plans, transformation rules are deferred for later passes.

Subsequent passes can then use the costs generated in previous passes as an upper bound, allowing for more cost-based pruning. This has the effect of generating the optimal plan while exploring a smaller search space and reducing the execution time of the optimizer.

The search data structure retains its content between optimization passes. Thus, a subsequent pass can utilize solutions obtained in a previous pass. Each plan is identified with the pass in which it was generated. As subsequent passes are made, the optimizer considers those plans generated In previous passes having the same required physical properties but reoptimizes their inputs since additional rules exist that can generate a lower cost plan.

Figure 12:
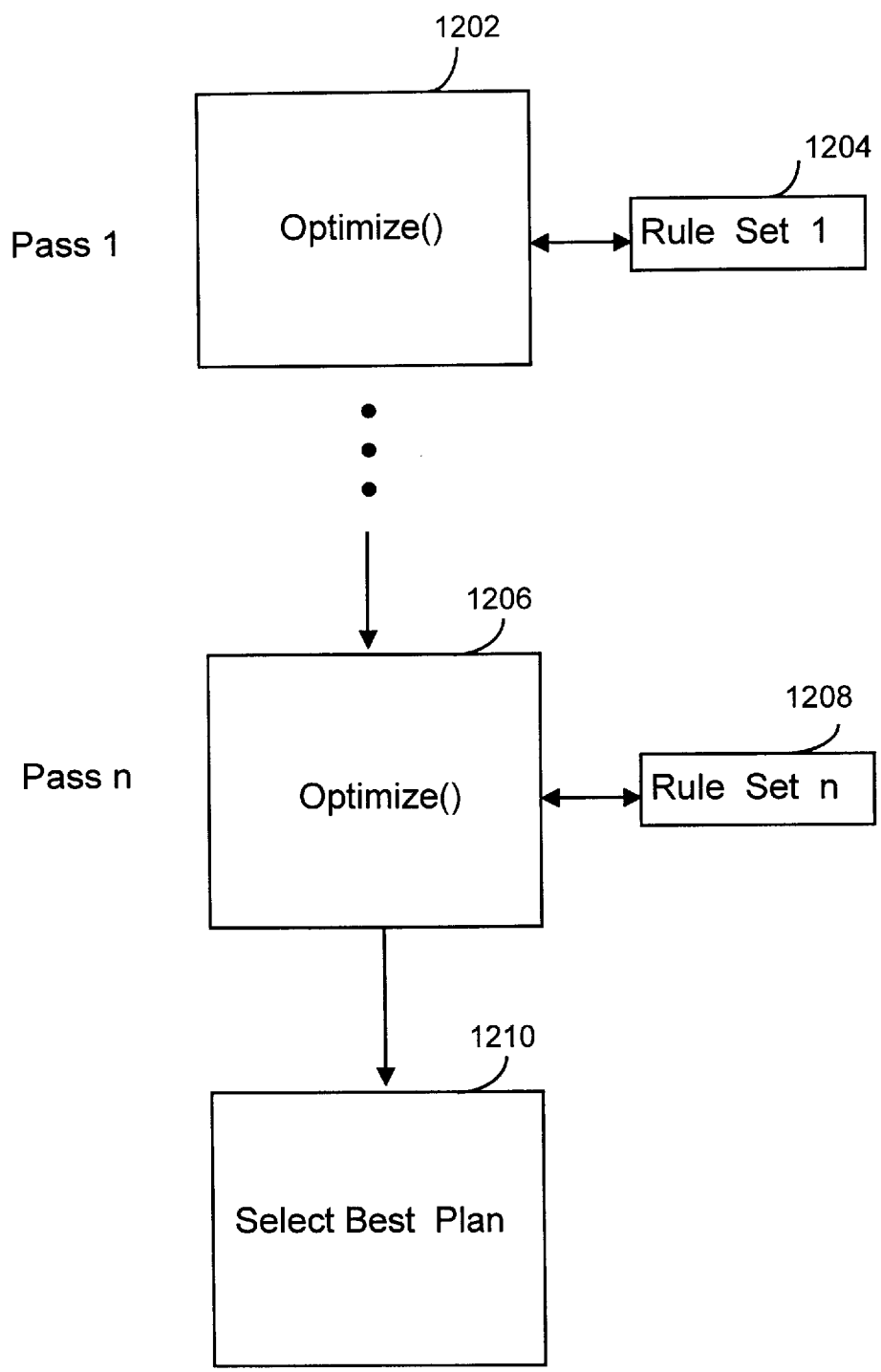
FIG. 12 illustrates the multipass optimization scheme.

Referring to FIG. 12, in the preferred embodiment of the present invention, a first pass (step 1202) through the optimizer is used to generate one or more solutions for the input query. In this first pass, only those rules 1204 that are enabled for the pass are used to generate the solutions. Preferably, this subset consists of implementation rules since they generate physical expressions and hence plans more readily. In subsequent passes (step 1206), additional rules 1208 are available in order to add plans to the solution space. At the completion of the desired number of optimization passes, a best plan is selected (step 1210) from the plans included in the search data structure.

Task Structure

The aforementioned search procedure is implemented by the search engine as a set of tasks. Each task performs predefined operations and invokes one or more additional tasks to continue the search if needed. Each task terminates upon completion of its assigned operations. A task stack is utilized to store tasks that are awaiting execution and is preferably operated in a last-in-first-out manner. A task scheduler reads tasks from the top of the task stack and schedules one or more of the tasks that are pending execution.

The task structure is advantageous for providing parallel searching in a multiprocessor environment. The task structure can be represented by a program dependence graph that captures dependencies or the topological ordering among the tasks. This ordering is then used by the task scheduler to schedule one or more of the tasks to execute on one or more processors.

The task structure is also amenable for use in an object-oriented processing environment. Preferably, each task can be represented as an object with each object having an associated method defining the operations to be performed. Task objects offer flexibility since a task object can be instantiated several times for different situations and each instantiation can be placed onto the task stack for execution.

Referring to FIGS. 1–5, the optimize procedure 402 receives an input query 148 in the form of a query tree 204 (step 502) and builds a Memo search data structure 122 containing each logical expression in the query tree 204 (step 504). Initially, the group attributes of each expression in the query tree are determined by the initialization and are used to store each expression in a separate group in the Memo 122 (step 504). Next, the group number containing the root node of the query tree is retained (step 506). This will be used at a later point to retrieve the plans generated for the input query. The optimize procedure 402 then places onto the task stack the Optimize_Group task 124 with the group number of the root node and the required physical properties (step 508). The procedure then waits for the completion of the optimization process which is indicated by the task stack being empty (step 510). Multiple optimization passes can execute before the task stack is emptied. At the completion of the optimization process, the contexts in the group number of the root node is scanned. The plan having the lowest cost is selected as the optimal plan to execute the input query (step 512).

The Optimize_Group task 124 is used to obtain a plan for a specified group having certain physical properties. If no such plan exists, the task initiates those tasks that will generate zero or more plans for the specified group having the required physical properties.

Figure 6:
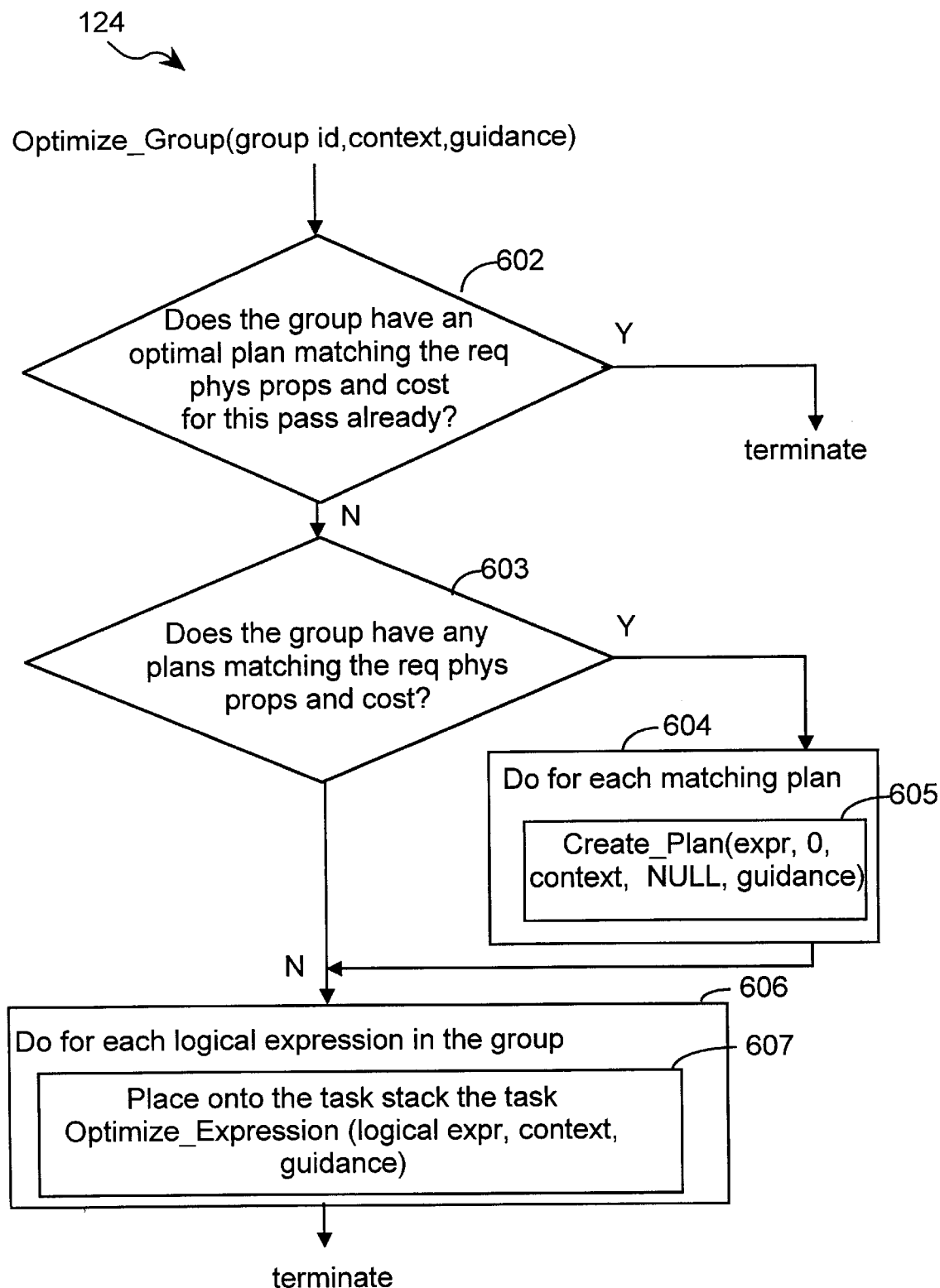
FIG. 6 is a flow chart of the Optimize_Group task in a preferred embodiment of the present invention.

Referring to FIG. 6, the Optimize_Group task 124 determines whether an optimal plan for the current pass matching the required physical properties and cost exists for the specified group (step 602). The required physical properties and cost are contained in the context that is passed to the task. If an optimal plan exists in the group for the current plan and for the requested required physical properties and cost, the task terminates (step 602-Y). Otherwise (step 602-N), the task proceeds to check if the group has any plans matching the requested required physical properties and cost that were generated from any of the previous passes (step 603). This is accomplished by scanning the contexts associated with the previous passes in the same manner as noted above in step 602 except that a plan's pass generated field 348 is ignored. For each existing plan having the same required physical properties (step 604), a Create_Plan task is placed onto the task stack with the expression, with a zero parameter indicating no previous calls to the Create_Plan task have been made for this expression, the context for the expression, and the guidance (step 605). The process than proceeds to step 606.

When no plan exists in the group having the requested required physical properties, an attempt is made to generate a new plan. This is generated by pushing onto the task stack the Optimize_Expression task 126 for each logical expression contained in the group with the associated context and guidance (steps 606–607). The Memo structure stores all the logical expressions associated with this group.

Figure 7:
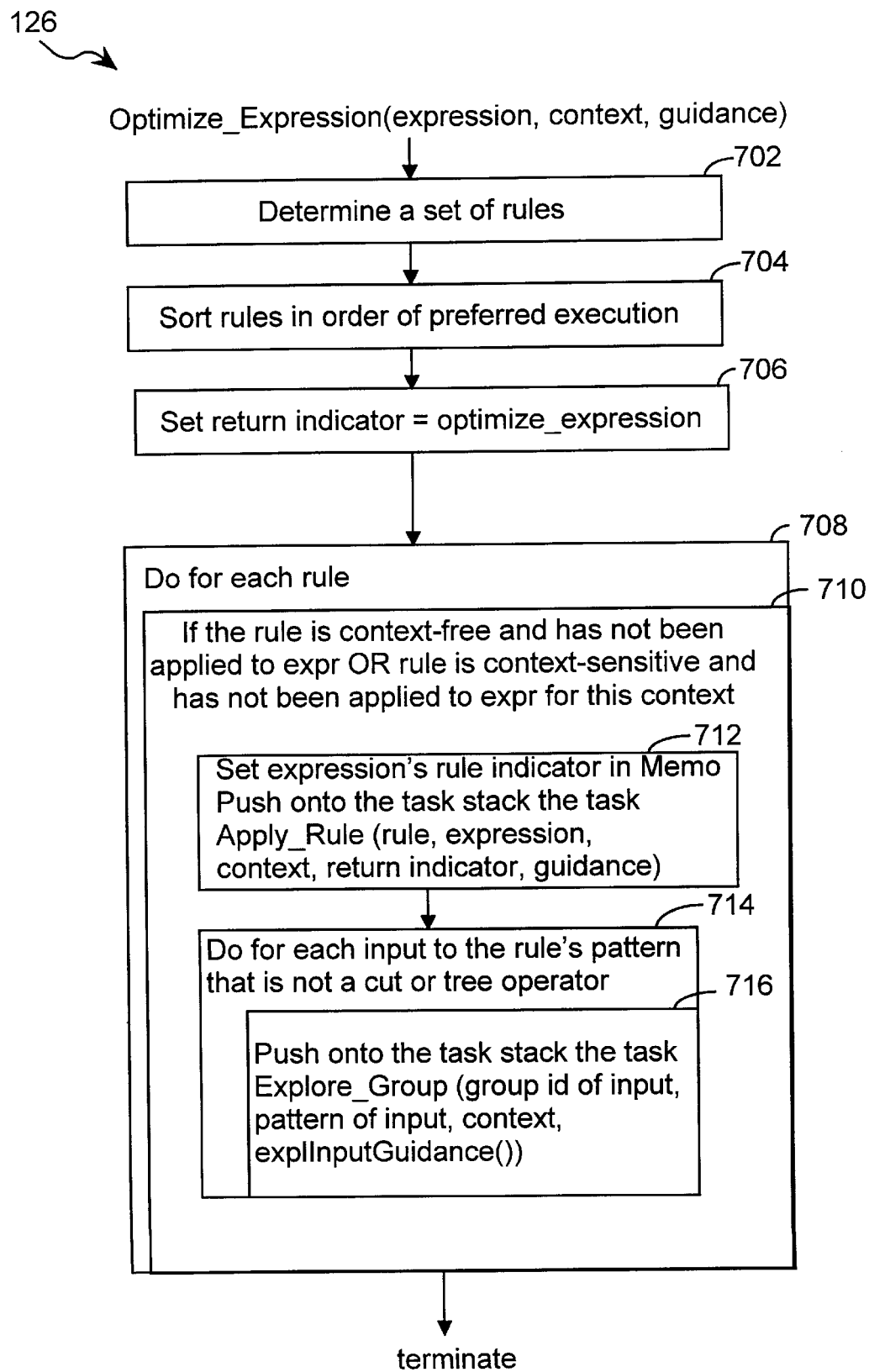
FIG. 7 is a flow chart of the Optimize_Expression task in a preferred embodiment of the present invention.

Referring to FIG. 7, the Optimize_Expression task 126 is used to select a set of rules for use in generating additional logical and physical expressions associated with the specified logical expression. Each rule is then applied in a certain order. For certain rules that have an explicit operator as an input other than a cut or tree operator, exploration transformations on the input are performed before a rule is applied. This ensures that all possible logical expressions are available before the rule is applied.

The rules that are selected for application for a particular logical expression are a function of the DBI (step 702). As noted above previously, the DBI contains search heuristics in the form of an enable method, match functions, promise functions, cutoff methods, and guidance methods. These search heuristics are utilized in determining which rules to use. The enable method determines whether a rule is applicable for a particular pass. The match methods identify those rules having an operator that matches a particular expression. The guidance structures specify information concerning the future search activity based on past search operations. The promise functions associate a value with each rule indicating how suitable the particular rule is for the particular expression. The cutoff methods limit the number of rules that are applied for a particular expression. The limit is considered the cutoff point.

The rules are selected and stored in a preferred order of execution which is based on the promise value associated with a rule (step 704). A return indicator is set to identify the Optimize_Expression task 126 (step 706) as the task which invoked the Apply_Rule task 134. This is to ensure that in the event a new logical expression is produced, additional transformations for the new expression are generated.

Next, the task processes each rule in accordance with the preferred order of execution (step 708). Since the stack is operated in a FIFO order, the last rule to be executed is pushed onto the stack first and the first rule to be executed is pushed onto the stack last. A rule is executed in certain situations. It is applied when the rule is a context-free rule that has not been previously applied to the expression or when the rule is a context-sensitive rule that has not been applied previously to the expression and for the particular required physical properties (step 710). These situations are determined by checking the logical expression in the search data structure. The applied context-free rule bit map 332 indicates which context-free rules have been applied previously to the expression and the applied context-sensitive rule list 334 indicates the context-sensitive rules that have been previously applied for the corresponding required physical properties.

If either of these situations are not applicable, the rule is bypassed. Otherwise, the appropriate rule indicators associated with the logical expression are set and the Apply_Rule task 134 is pushed onto the task stack for the rule (step 712). For each input to the rule's pattern that is not a cut operator or a tree operator (step 714), the Explore_Group task 128 is pushed onto to the stack with the group identifier of the input, the pattern of the input, the required physical properties, and a new guidance structure obtained from the method explInputGuidance() (step 716). The Explore_Group task 128 will ensure that all possible exploration transformations for this pattern are produced before the rule is applied.

Figure 8:
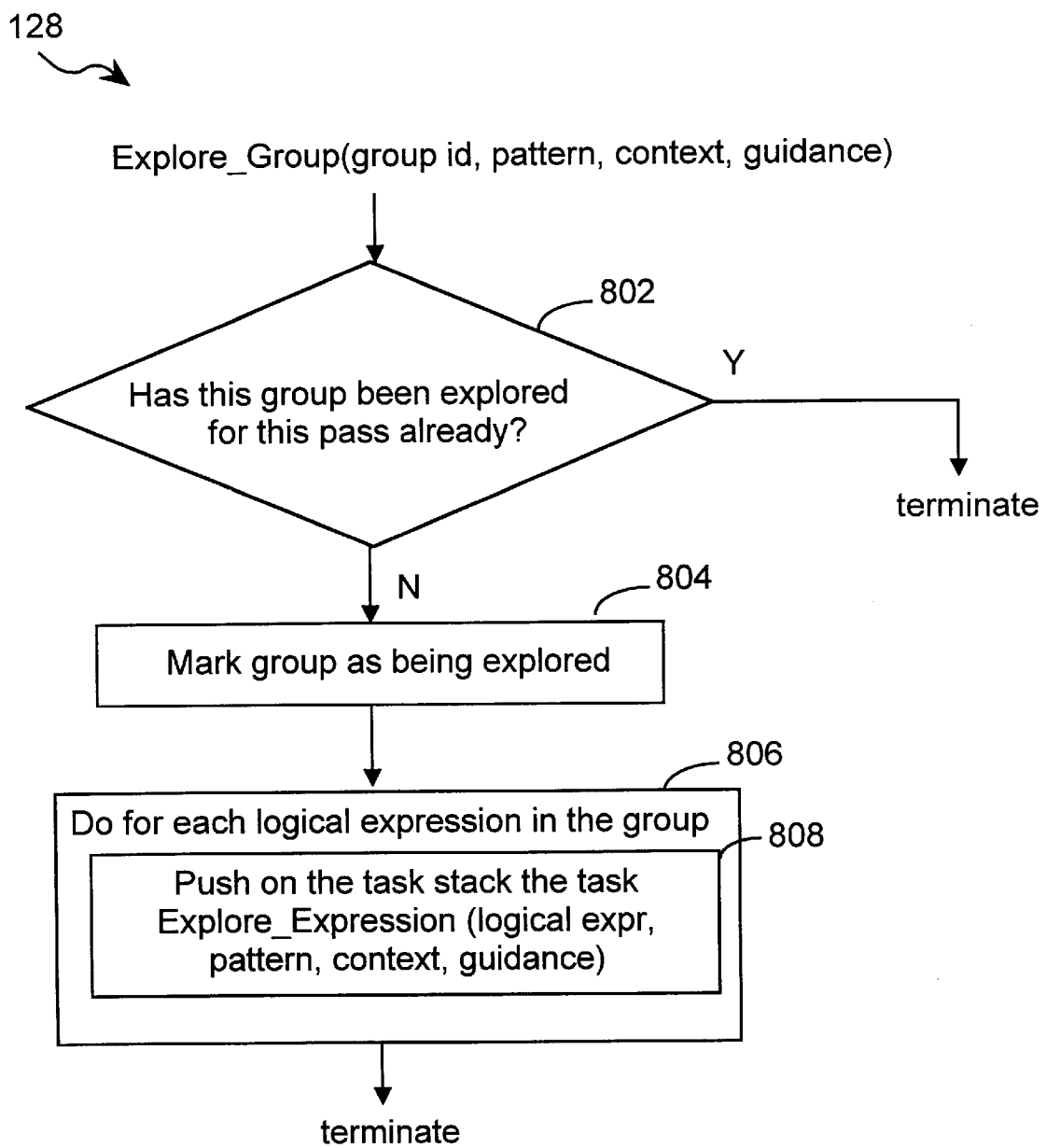
FIG. 8 is a flow chart of the Explore_Group task in a preferred embodiment of the present invention.

Referring to FIG. 8, the Explore_Group task 128 is used to determine if the group has been explored previously. When a group is explored, all possible context-free transformations rules are applied to each logical expression. As such, exploration needs to be applied only once for a group per pass. The exploration pass 307 associated with the group indicates if the group has been explored for a particular pass. Thus, the Explore_Group task 128 checks if a group has been explored previously for the pass (step 802). If so (step 802-Y), the task terminates. Otherwise (step 802-N), the exploration pass 307 associated with the group is marked as explored for the pass (step 804). The task pushes onto the task stack the Explore_Expression task 130 (step 808) for each logical expression in the specific group (step 806).

Figure 9:
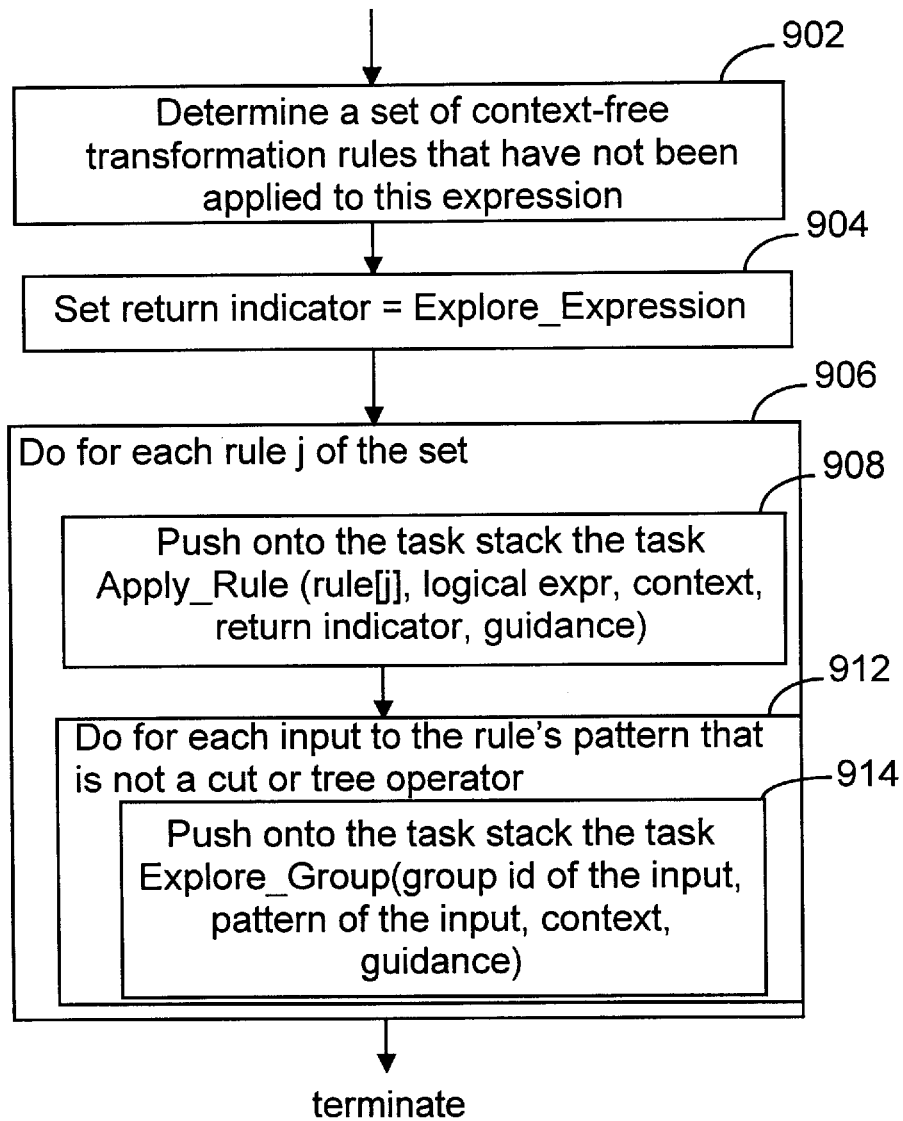
FIG. 9 is a flow chart of the Explore_Expression task in a preferred embodiment of the present invention.

Referring to FIG. 9, the Explore_Expression task 130 is used to explore a specific expression. First, a set of suitable context-free transformation rules that have not been applied previously to this particular expression are selected. The applied context-free rule bit map 332 is searched to determine this set of rules (step 902). The pattern that is passed to the task is used in the determination of the appropriate rules to select. A return indicator is set to Explore_Expression in order for the Apply_Rule task 134 to proceed with further processing once a new logical expression is generated (step 904). Each rule is applied in a specified order (step 906) and a Apply_Rule task 134 is pushed onto the task stack for each rule along with the specified logical expression, the required physical properties, return indicator, and guidance (step 908). For each input to a rule that is not a tree or cut operator (step 912), the Explore_Group task 128 is pushed onto the task stack along with the group identifier for the input, the pattern of the input, and the guidance (step 914).

The Apply_Rule task 134 is used to implement a rule thereby creating a new expression. The application of a rule matches an expression's operators in the same position as specified in the rule's pattern and produces an equivalent expression as specified in the rule's substitute. Prior to applying a rule to an expression, the Apply Rule task 134 finds all possible bindings that match the rule's pattern. The purpose of a binding is to find all possible logical expressions that can match a rule's pattern. Bindings are often encountered for rules that span more than one level and which have specific patterns for one or more input expressions. An input expression is denoted in the Memo structure 122 by its corresponding group identifier. This implies that any expression in the group can be used as the input expression. A binding serves to associate a particular expression for each input expression specified in a rule's pattern.

Figure 15A:
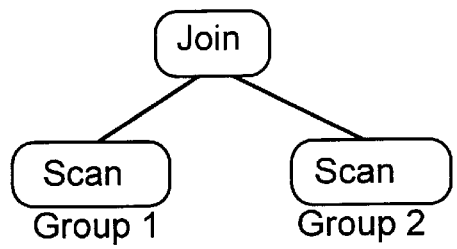
FIGS. 15A–15C illustrate the general concept of the binding process.
Figure 15B:
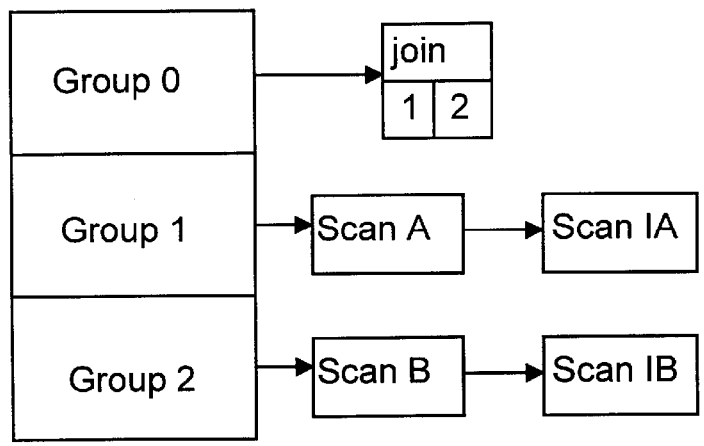
Figure 15C:
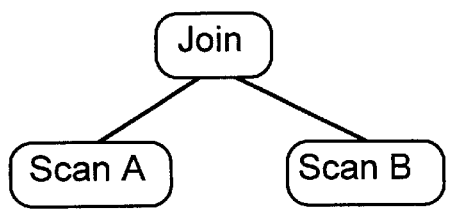
Figure 15C:
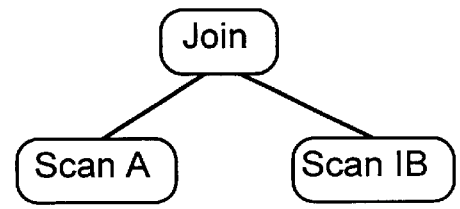
Figure 15C:
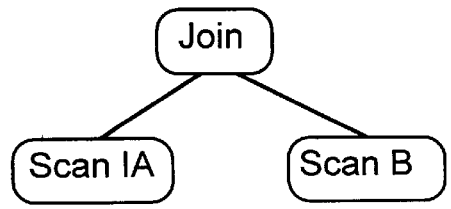
Figure 15C:
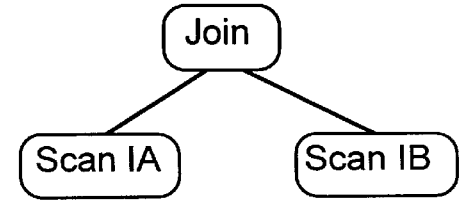

The general concept of a binding is represented in FIGS. 15A–15C. FIG. 15A illustrates the rule's pattern, FIG. 15B illustrates the Memo structure for this example, and FIG. 15C illustrates the four bindings that result in this example. The rule's pattern indicates that the top operator can be any Join operator and that the first input is any logical expression from group 1 and the second input is any logical expression from group 2. FIG. 15B illustrates the logical expressions in groups 1 and 2. FIG. 15C illustrates the four expressions that result by binding the different logical expressions found in these groups with the rule's pattern. Each of the expressions is represented as an expression tree where each expression has actual expressions as inputs rather than group identifiers.

Figure 15D:
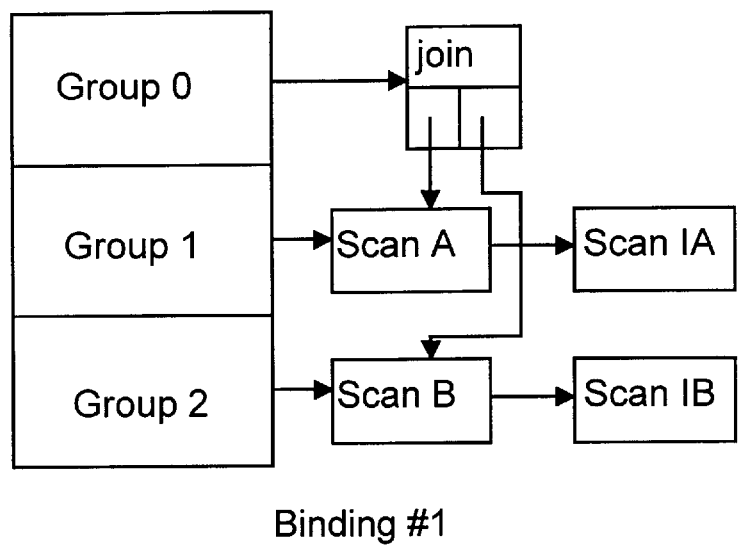
FIGS. 15D–15G illustrate binding input expressions to a parent expression through the use of the parent expression's input pointers.
Figure 15E:
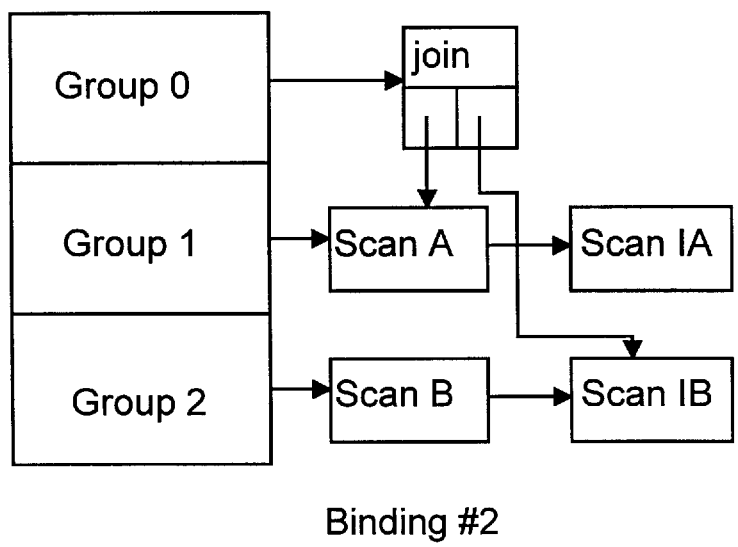
Figure 15F:
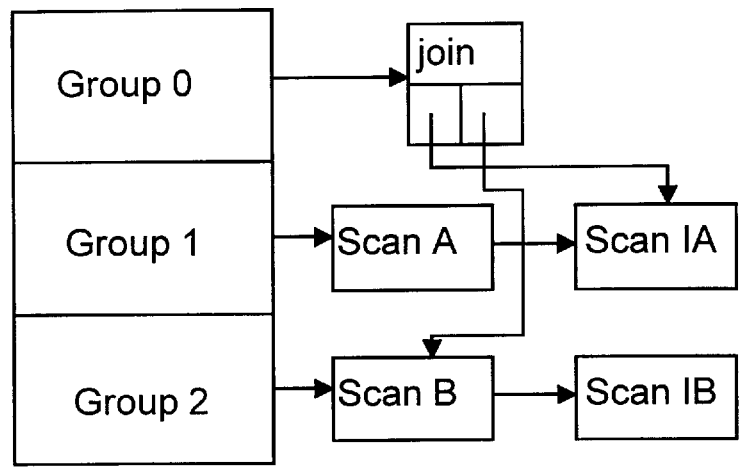
Figure 15G:
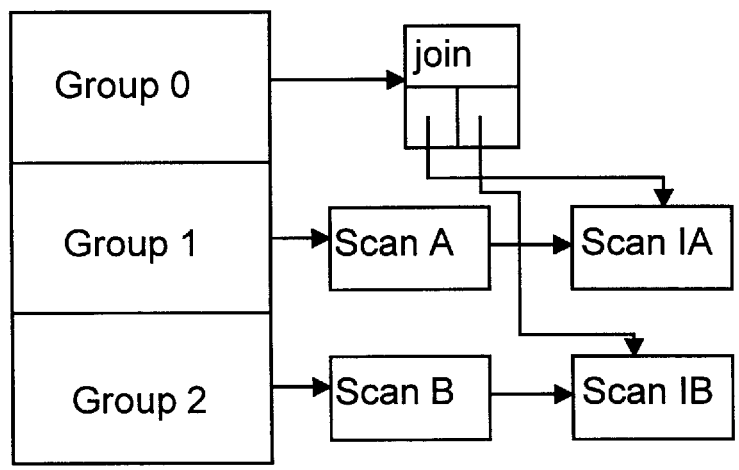

A binding is made by adjusting the pointers of the input expressions for a logical expression. In the above example, the link mode 330 of each input expression is placed in binding mode and the pointer is adjusted to address a specific logical expression in the group. FIG. 15D illustrates the first binding which is generated by placing the pointers in binding mode and addressing the first logical expression in each group. Additional bindings are generated by advancing the input expressions pointers which is shown in FIGS. 15E–15G.

As the bindings are generated, each logical expression is checked if it is currently bound. This is done in order to prevent a circular binding which can set the search engine into a state of infinite recursion. Potential bindings that are already in use are skipped.

The application of a rule can generate one or more substitutes. Typically, a rule's substitute is not known ahead of time. Depending on the type of rule that is applied, subsequent tasks are invoked to continue the search process of generating a plan. In the case where an implementation rule is applied, a new physical expression is created. In order for a plan to be generated from this physical expression, plans for each of its inputs need to be obtained. Thus, the Create_Plan task 132 is invoked.

In the case where a new logical expression is generated as a result of exploring an expression, additiorial logical transformations are generated for the new expressions (invocation of the Explore_Expression task 130). In the case where a new logical expression is generated as a result of optimizing an expression, additional logical and physical transformations are applied to the new expression (invocation of the Optimize_Expression task 126).

Figure 10A:
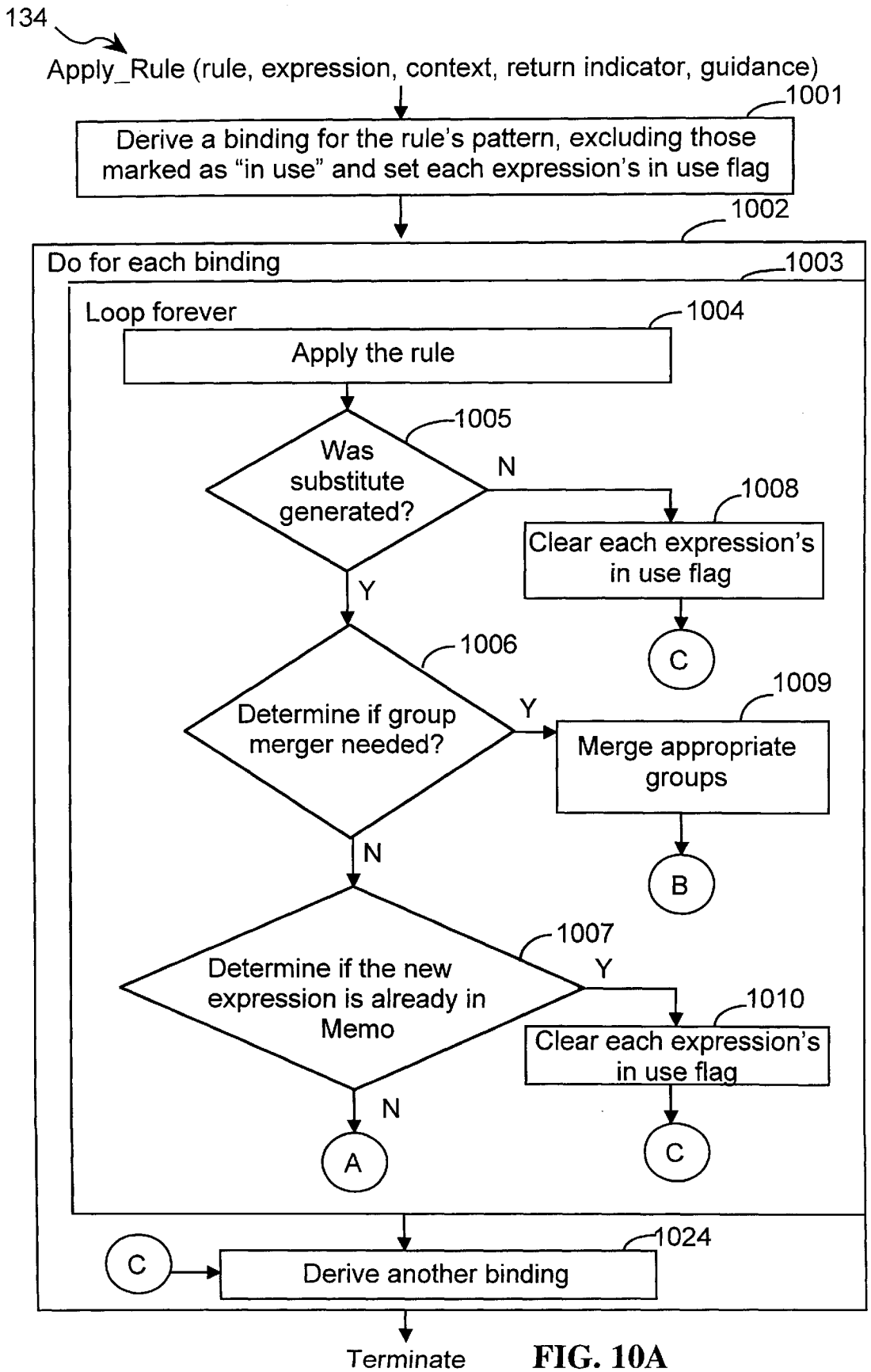
FIGS. 10A–10B are flow charts of the Apply_Rule task in a preferred embodiment of the present invention.
Figures 10, 10A, 10B:
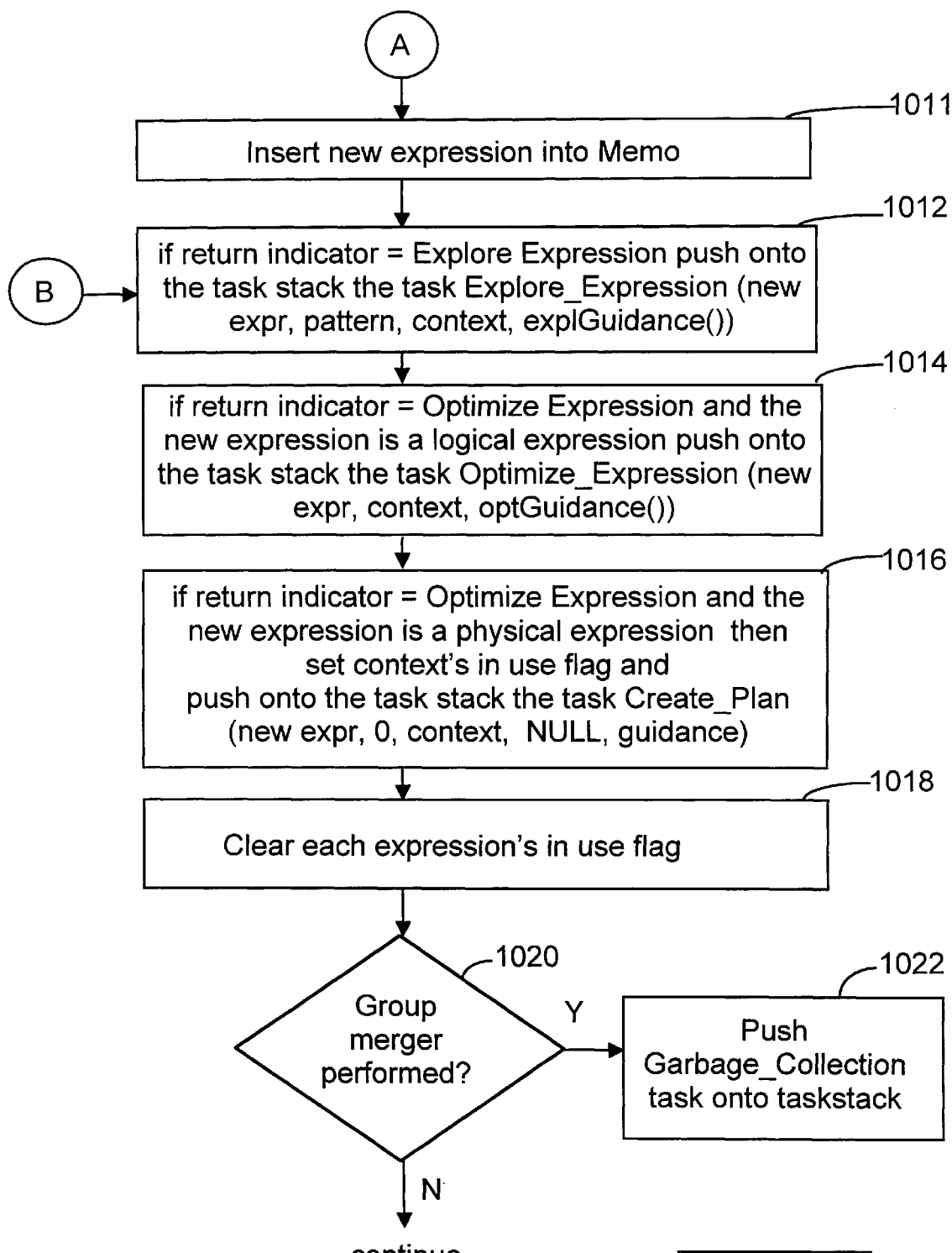

Referring to FIGS. 10A–10B, the Apply_Rule task 134 determines one binding for the specified rule's pattern and sets each bound expression's in use flag (step 1001). If an expression is already marked as "in use", that expression is not used. Then, the task iterates for each binding (step 1002). Since a rule can produce one or more substitutes, the task loops while a substitute is generated (step 1003). The rule is applied (step 1004) and if no substitute is generated (step 1005-N), each bounded expression's in use flag is cleared (step 1008) and the task continues by deriving another binding (step 1024). Otherwise, if a substitute was generated (step 1005-Y), a new expression is created in accordance with the rule's substitute.

Next, the task determines if group merger is required (step 1006). Group merger applies when the application of a rule merges two groups. This occurs with rules such as the "elimination groupby" rule. The pattern and substitute of this rule is as follows: groupby(cut)→cut. As such, the application of this rule merges the group associated with the groupby expression and the group that replaces the cut operator.

The check for group merger consists of detecting the particular rule that was applied. If it requires group merger (step 1006-Y), the two groups are merged (step 1009). The merger of two groups requires merging their group attributes, context lists, physical expression lists, logical expression lists, plan lists and so on. The group having the lower group identifier remains and the group having the higher group identifier is merged to it. A Garbage Collection task 135 is later scheduled (step 1022) to change all references to the higher group identifier by other expressions in the search data structure to the merged group identifier. In addition, the Garbage Collection task 135 eliminates duplicate expressions that result from the merger.

If the new expression is already in the Memo structure 122 (step 1007-Y), each bounded expression's in use flag is cleared (step 1010) and the task proceeds to derive another binding (step 1024). Otherwise (step 1007-N), it is inserted as follows (step 1011). Each expression in the Memo structure 122 is assigned a hash value that is based on its contents and the groups of its inputs. The hash values are stored in a hash table. When a new expression is generated, a hash value is determined for the expression. If it exists in the hash table then the new expression is possibly a duplicate and requires further checking. The expression that corresponds to the hashed value is compared with the newly generated expression. If they both have the same number of inputs, the same ordinal position of the inputs, characteristic inputs, characteristic outputs, and predicates, the expressions are identical. Otherwise, if they differ, the newly generated expression is inserted into the search data structure.

If the hash value does not reside in the hash table, the new expression is inserted in the Memo structure 122 and the corresponding hash value is inserted in the hash table. When an implementation rule is applied, a new physical expression is inserted and when a transformation rule is applied, a new logical expression is inserted. Although this is the preferred implementation for detecting duplicate expressions in the Memo structure, the present invention is not constrained to this scheme and others can be utilized.

Next, the Apply_Rule task 134 places onto the task stack 136 the next task to continue the processing associated with the substitute. The return indicator dictates the appropriate task. If the return indicator indicates that the Apply_Rule task 134 was invoked from an Explore_Expression task 130, the task 134 proceeds to push onto the task stack 136 the Explore_Expression task 130 for the newly generated expression with the required physical properties and the guidance structure (step 1012). If the return indicator is set to Optimize_Expression and the newly created expression is a logical expression, the task 134 pushes onto the task stack 136 the task Optimize_Expression with the newly generated expression, the required physical properties, and with a new guidance structure generated by the method optGuidance() (step 1014). If the return indicator indicates Optimize_Expression and the newly generated expression is a physical expression, the Apply_Rule task 134 pushes onto the task stack 136 the task Create_Plan 132 with the appropriate parameters (step 1016). Next, each expression's in use flag is cleared (step 1018) before the task is terminated.

Lastly, if group merger was performed (step 1020-Y), the task places the Garbage Collection task 135 on the task stack (step 1022). The Garbage Collection task 135 is placed onto the task stack at this point since it needs to be the next task that is executed. Otherwise (step 1020-N), the task continues. Another binding is then generated as described above (step 1024) and the process is repeated for the newly bounded expression. When each possible binding has been processed, the task terminates.

Figure 11:
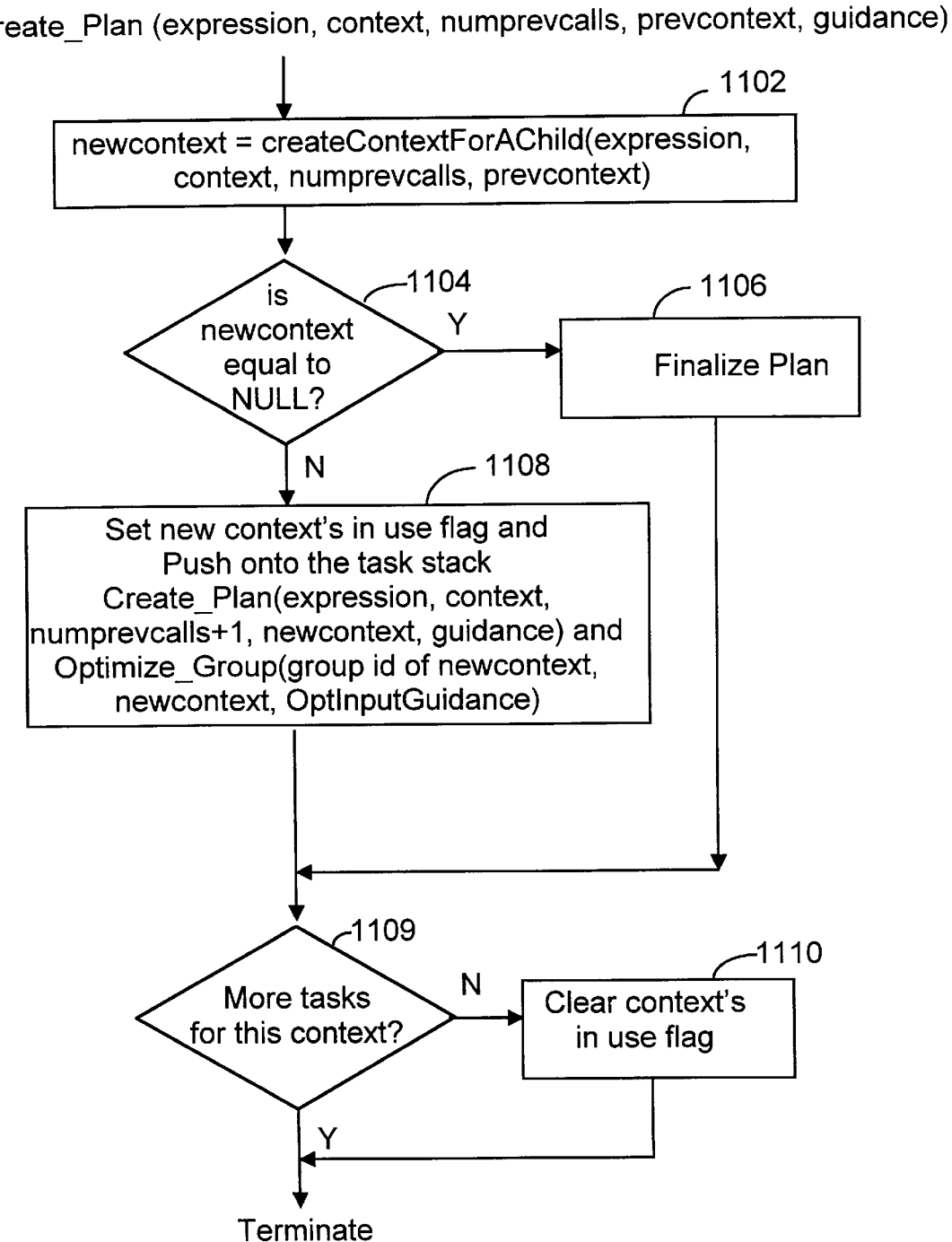
FIG. 11 is a flow chart of the Create_Plan task in a preferred embodiment of the present invention.

FIG. 11 describes the steps used in the Create_Plan task 132. The goal of the Create_Plan task 132 is to find a plan (or solution) for the expression that is passed to the task. This consists of finding a plan for each input to the expression. A plan for the expression will be generated if the cost for the plan does not exceed a prescribed upper bound (which is the cost limit contained in the context for the associated expression).

The expression for which a plan is being obtained is associated with a set of required physical properties. There can be many combinations of these required physical properties for the inputs of the expression. Each combination is considered a separate subproblem for each input. However, each combination need not be considered by the search engine. The Create_Plan task utilizes the createContextForAChild method of the DBI to determine the combinations that the search engine should consider.

The Create_Plan task calls the createContextForAChild method with the expression, the expression's context, the number of previous calls (numprevcalls) to the task with this expression, and a previous context (step 1102). The expression's context contains the required physical properties for the expression. The createContextForAChild method returns a new context including the appropriate required physical properties for one of the inputs or a NULL value. The NULL value indicates that the expression is ready to be finalized. This can be due to the fact that all appropriate combinations of required physical properties for the inputs have been exhausted or that the expression has no inputs.

If the new context is not NULL (step 1104-N), the task sets the new context's in use flag and places onto the task stack a Create_Plan task and a Optimize_Group task with the appropriate parameters (step 1108).

If the new context is NULL (step 1104-Y), a plan is finalized for the expression. The cost for the expression is obtained from the costing function which was previously described above. If the expression does not have inputs, the cost for the expression is checked against the cost in its context. If the cost exceeds the context's cost limit, a plan is not generated for the expression and the task terminates. If the cost does not exceed the context's cost limit, a plan 305 is created for the expression. The plan includes the expression 338, its cost 344, the context 342, required physical properties 346, and an indicator 348 that specifies the pass in which it was generated. The context 308 for the expression is updated to include this plan. The context's current plan pointer 320 is updated to point to the plan, if the plan has the lowest cost.

If the expression has inputs, a plan 305 is created if the input plans do not exceed the expression's cost limit. The task obtains a plan for each input from the previously generated plans that were returned in the precontext parameter and determines whether inclusion of the plan will exceed the expression's cost limit. The expression will utilize an input's plan if it does not exceed the expression's cost limit. The expression's cost will be updated to reflect the cost of its inputs. If the expression's cost is excessive, a plan is not generated for the expression and the task terminates. Otherwise, a plan 305 is generated which includes the expression 338, pointers to the contexts of each input 340, the expression's context 342, its cost 344, the required physical properties 346, and an indicator 348 that specifies the pass in which it was generated. The context 308 for the expression is updated to include this plan. The context 308 for the expression is updated to include this plan. The context's current plan pointer 320 is updated to point to the plan, if the newly generated plan is the lowest cost plan.

Further, the Create_Plan task determines if the context is associated with any other tasks (step 1109). A counter can be associated with the context that indicates the number of tasks still yet to be processed for the context. This counter can be incremented each time a Optimize_Expression, Apply_Rule or Create_Plan is pushed onto the task stack for the context and decremented each time one of these tasks terminates. A check is made to determine if any more tasks for this context are outstanding (step 1109). When the counter is zero, then the context's in use flag is cleared (step 1110). Lastly, the task terminates.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to a distributed computer system. It may be practiced without the specific details and may be implemented in various configurations, or makes or models of tightly-coupled processors or in various configurations of loosely-coupled microprocessor systems.

A principal aspect of the query optimizer presented herein is that it is extensible to suit almost any type of data model. Thus, the present invention can be applied to optimize queries on object-related database management systems, object databases, and even data contained in spreadsheets. In essence, the query optimizer presents one interface for dealing with heterogenous data as well as data models.

Additionally, the query optimizer can be applied to optimize problems other than database queries or SQL queries. Furthermore, the rules need not be fixed at compile time. Rules could be added and removed dynamically as a result of executing tasks especially between optimization passes.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. A computer-implemented method for generating a plan for executing a database query, comprising:
   (a) representing said database query as a query tree including one or more levels of logical expressions, each logical expression including zero or more logical expressions as inputs, a subset of said inputs representing one or more subtrees, each subtree having a top logical expression and zero or more logical expressions as inputs, each level other than a top level having one or more logical expressions that are input to a higher level logical expression at a preceding level, one of said logical expressions representing a root expression, each logical expression including zero or more inputs and zero or more outputs;
   (b) for each said logical expression in said query tree, determining group attributes for each said logical expression, said group attributes including a set of characteristic inputs and a set of characteristic outputs, said characteristic inputs representing inputs required for a particular logical expression and zero or more logical expressions at one or more subsequent levels to said particular expression, said characteristic outputs representing outputs generated by a specified logical expression and zero or more logical expressions at one or more preceding levels to said specified logical expression;
   (c) storing in a memory a search data structure used to store a plurality of groups, each said group representing equivalent expressions having common group attributes, each said group including at least one logical expression, zero or more equivalent expressions associated therewith, and one or more plans, each of said plans implementing at least one expression associated with each said group;
   (d) for each said logical expression in said query tree, storing each said logical expression in a corresponding one of said groups in said search data structure associated with each said logical expression's group attributes;
   (e) obtaining a plurality of rules for use in generating one or more equivalent expressions or one or more plans;
   (f) partitioning said query tree into one or more levels of subproblems, each subproblem including one or more of said logical expressions stored in said search data structure, a first level having one of said subproblems representing said root expression, each subproblem at each subsequent level representing one of said inputs to a corresponding logical expression at a preceding level, each subproblem associated with one of said groups in said search data structure;
   (g) determining at least one plan for each of said subproblems, said determining step further comprising the steps of:
      (1) selecting a set of one or more rules for application to one or more expressions of a particular one of said subproblems;
      (2) generating zero or more equivalent expressions from applying said set of rules to one or more expressions associated with said particular subproblem;
      (3) for each said generated equivalent expressions,
         (i) providing an associated set of group attributes for each said generated equivalent expression,
         (ii) using said group attributes and said generated equivalent expression to determine if a duplicate expression matching said generated equivalent expression is currently stored in said search data structure, and
         (iii) storing said generated equivalent expression in a group of said search data structure having equivalent group attributes when no duplicate expression as said generated equivalent expression exists in said search data structure; and
      (4) forming one or more plans from one or more expressions associated with said particular subproblem; and
   (h) generating a plan for said database query from said plans associated with each of said subproblems.

2. The method of claim 1,
said step (b) further comprising the steps of:
   traversing each said level of said query tree from said top level to a bottom level to determine characteristic inputs for each expression at each traversed level;

for each said expression at each said traversed level, determining a corresponding set of characteristic inputs for a particular one of said expressions, said set including characteristic inputs for said particular expression and for expressions in one or more preceding levels; and traversing each said level of said query tree from said bottom level to said top level to determine characteristic outputs for each expression at each traversed level; and for each said expression at each said traversed level, determining a corresponding set of characteristic outputs for a particular one of said expressions, said set including characteristic outputs for said particular expression and for expressions in one or more succeeding levels.

3. The method of claim 2, said set of characteristic inputs including a minimum number of said characteristic inputs and said set of characteristic outputs including a minimum number of said characteristic outputs.

4. The method of claim 1, said step (g)(3) further comprising the step of associating a cost with each said generated equivalent expression, said cost based on a prescribed criteria that considers said computing environment executing said method and a context associated with each said generated equivalent expression; and said step (g)(4) further comprising the step of selecting one or more expressions associated with said particular subproblem having an associated cost that is lower than a threshold cost associated with said particular subproblem.

5. The method of claim 1, said step (g)(1) further comprising the step of providing one or more search heuristics for selecting said set of rules, one of said search heuristics selecting ones of said rules that can be applied to a particular one of said expressions and to a substitute expression that is generated from said particular expression.

6. The method of claim 1, said step (g) further comprising the step of merging two groups in accordance with an application of a specified one of said rules, said merging step further comprising the steps of:
  selecting a first one of said merged groups to store contents of both merged groups and selecting a second one of said merged groups to merge with said first merged group;
  adjusting references in said search data structure to said second group as said first group;
  detecting duplicate expressions in said search data structure; and
  deleting said detected duplicate expressions.

7. The method of claim 1, said step (g)(3)(i) further comprising the step of:
  for a particular one of said generated equivalent expressions corresponding to a top level expression, assigning said top level expression's group attributes to said particular expression.

8. The method of claim 7, said step (g)(3)(i) further comprising the step of:
  for a particular one of said generated equivalent expressions corresponding to a logical expression having inputs, performing a dataflow analysis to determine group attributes for said particular generated equivalent expression; and said step (g)(3)(iii) further comprising the step of:
  for said particular generated equivalent expression, storing said particular generated equivalent expression in a new group in said search data structure.

9. A database query optimization system, comprising:

a memory for storing
  a query tree representing a database query, said query tree including one or more levels of logical expressions, each logical expression including zero or more logical expressions as inputs, a subset of said inputs representing one or more subtrees, each level other than a top level having one or more logical expressions that are input to a higher level logical expression at a preceding level, one of said logical expressions representing a root expression,
  a search data structure including a plurality of groups, each said group representing equivalent expressions having common group attributes, each said group including at least one logical expression from said query tree, zero or more equivalent expressions associated therewith, one or more plans, and one or more contexts, each of said plans implementing at least one expression associated with said group and having an optimization goal and a cost, each of said contexts having an associated optimization goal and representing ones of said plans that are compatible with said context's associated optimization goal, and
  a plurality of rules for use in generating one or more equivalent expressions or one or more plans;

a search engine for generating one or more plans that execute said database query, said search engine including instructions that
  determine group attributes for each said logical expression in said query tree, said group attributes including a set of characteristic inputs and a set of characteristic outputs, said characteristic inputs representing inputs required for a particular logical expression and zero or more logical expressions at one or more subsequent levels to said particular expression, said characteristic outputs representing outputs generated by a specified logical expression and zero or more logical expressions at one or more preceding levels to said specified logical expression,
  store each said logical expression of said query tree in a corresponding one of said groups in said search data structure associated with said logical expression's group attributes,
  partition said database query into one or more subproblems, each subproblem including one or more of said logical expressions and an optimization goal, a first level having one of said subproblems representing said root expression, each subproblem at each subsequent level representing one of said inputs to a corresponding top logical expression at a preceding level, each of said subproblems associated with one of said groups corresponding to said top logical expression in said subproblem,
  formulate at least one plan for each of said subproblems from one or more expressions associated with each said subproblems, each said plan formulated by generating zero or more equivalent expressions from applying a set of rules to one or more expressions associated with a particular subproblem, each said generated expression having a set of group attributes associated therewith, said group attributes used to determine if said generated expression exists in said search data structure and to store said generated expression into an appropriate group in said search data structure, and generate a plan for said database query as a combination of each of said subproblem's plans.

10. The system of claim 9 further comprising:

a plurality of tasks, each task including a subset of said search engine's instructions;

a task scheduler that manages scheduling one or more tasks on one or more processors associated with said system; and a task data structure for storing one or more tasks awaiting execution.

11. The system of claim 9, a database implementor that utilizes heuristics in determining each subproblem's optimization goal.

12. The system of claim 11, said database implementor including a OnceGuidance heuristic for use in selecting ones of said rules that can be applied to a specified expression and to said specified expression's substitute.

13. The system of claim 9, said search engine further including instructions that
associate a cost with each said generated expression, said cost based on a prescribed criteria that considers performance characteristics associated with said system and a context associated with each said generated expression,
consider a subset of said generated expressions for formulation into a plan, said subset including ones of said generated expressions having an associated cost that is lower than a threshold cost associated with a particular one of said subproblems.

14. The system of claim 9, said search engine including instructions that
merge two groups of said search data structure when a predefined condition occurs,
adjust references in said search data structure to a first one of said merged groups to a second one of said merged groups,
detect duplicate expressions in said search data structure, and
delete said detected duplicate expressions.

15. The system of claim 9, said search engine further including instructions that
for a particular one of said generated expressions corresponding to a top level expression, assigns said top level expression's group attributes to said particular generated expression,
for a select one of said generated expressions corresponding to a logical expression having inputs,
performs a dataflow analysis to determine new group attributes for said select generated expression, and stores said select generated expression in a new group in said search data structure.

16. A computer readable storage medium for storing data for access by programs being executed on a data processing system, said medium comprising:

a query tree representing a database query, said query tree including one or more levels of logical expressions, each logical expression including zero or more logical expressions as inputs, a subset of said inputs representing one or more subtrees, each level other than a top level having one or more logical expressions that are input to a higher level logical expression at a preceding level, one of said logical expressions representing a root expression;

a search data structure including a plurality of groups, each said group representing equivalent expressions having common group attributes, each said group including at least one logical expression from said query tree, zero or more equivalent expressions associated therewith, one or more plans, and one or more contexts, each of said plans implementing at least one expression associated with said group and having an optimization goal and a cost, each of said contexts having an associated optimization goal and representing ones of said plans that are compatible with said context's associated optimization goal;

a plurality of rules for use in generating one or more equivalent expressions or one or more plans;

a search engine for generating one or more plans that execute said database query, said search engine including instructions that
determine group attributes for each said logical expression in said query tree, said group attributes including a set of characteristic inputs and a set of characteristic outputs, said characteristic inputs representing inputs required for a particular logical expression and zero or more logical expressions at one or more subsequent levels to said particular expression, said characteristic outputs representing outputs generated by a specified logical expression and zero or more logical expressions at one or more preceding levels to said specified logical expression,
store each said logical expression of said query tree in a corresponding one of said groups in said search data structure associated with said logical expression's group attributes,
partition said database query into one or more subproblems, each subproblem including one or more of said logical expressions and an optimization goal, a first level having one of said subproblems representing said root expression, each subproblem at each subsequent level representing one of said inputs to a corresponding top logical expression at a preceding level, each of said subproblems associated with one of said groups corresponding to said top logical expression in said subproblem,
formulate at least one plan for each of said subproblems from one or more expressions associated with each said subproblems, each said plan formulated by generating zero or more equivalent expressions from applying a set of rules to one or more expressions associated with a particular subproblem, each said generated expression having a set of group attributes associated therewith, said group attributes used to determine if said generated expression exists in said search data structure and to store said generated expression into an appropriate group in said search data structure, and
generate a plan for said database query as a combination of each of said subproblem's plans.

17. The medium of claim 16 further comprising:

a plurality of tasks, each task including a subset of said search engine's instructions;

a task scheduler that manages scheduling one or more tasks on one or more processors associated with said system; and a task data structure for storing one or more tasks awaiting execution.

18. The medium of claim 16, a database implementor that utilizes heuristics in determining each subproblem's optimization goal.

19. The medium of claim 18, said database implementor including a OnceGuidance heuristic for use in selecting ones of said rules that can be applied to a specified expression and to said specified expression's substitute.

20. The medium of claim 16, said search engine further including instructions that
associate a cost with each said generated expression, said cost based on a prescribed criteria that considers performance characteristics associated with said system and a context associated with each said generated expression,
consider a subset of said generated expressions for formulation into a plan, said subset including ones of said generated expressions having an associated cost that is lower than a threshold cost associated with a particular one of said subproblems.

21. The medium of claim 16, said search engine including instructions that
merge two groups of said search data structure when a predefined condition occurs,
adjust references in said search data structure to a first one of said merged groups to a second one of said merged groups, and
delete duplicate expressions in said merged group.

22. The medium of claim 16, said search engine further including instructions that
for a particular one of said generated expressions corresponding to a top level expression, assigns said top level expression's group attributes to said particular generated expression,
for a select one of said generated expressions corresponding to a logical expression having inputs,
performs a dataflow analysis to determine group attributes for said select generated expression, and
stores said select generated expression in a new group in said search data structure.

* * * * *